US012752934B2

(12) United States Patent
Mackay

(10) Patent No.: US 12,752,934 B2
(45) Date of Patent: Oct. 6, 2026

(54) ON-GROUND AIRCRAFT SERVICE SYSTEM

(71) Applicant: PRATT & WHITNEY CANADA CORP., Longueuil (CA)

(72) Inventor: Daniel Mackay, Richmond Hill (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/799,243

(22) Filed: Aug. 9, 2024

(65) Prior Publication Data

US 2024/0400227 A1 Dec. 5, 2024

Related U.S. Application Data

(63) Continuation-in-part of application No. 18/646,108, filed on Apr. 25, 2024, which is a continuation of application No. 17/322,739, filed on May 17, 2021, now Pat. No. 11,999,509.

(51) Int. Cl.

*B64F 1/28* (2006.01)
*B60L 9/00* (2019.01)
*B60L 50/50* (2019.01)
*B60L 53/16* (2019.01)

(Continued)

(52) U.S. Cl.

CPC .................................... *B64F 5/40* (2017.01); *B60L 9/00* (2013.01); *B60L 50/50* (2019.02); *B60L 53/16* (2019.02); *B64F 1/28* (2013.01); *B64F 1/364* (2013.01); *B60L 2200/10* (2013.01)

(58) Field of Classification Search

CPC ............... B64F 1/28; B64F 1/35; B64D 27/34

See application file for complete search history.

(56) References Cited

U.S. PATENT DOCUMENTS 6,631,775 B1 10/2003 Chaney
8,439,303 B2 5/2013 Koletzko
8,469,306 B2 6/2013 Kuhn, Jr.

(Continued)

FOREIGN PATENT DOCUMENTS

CN 212529379 U 2/2021
EP 3594125 A1 1/2020

(Continued)

OTHER PUBLICATIONS

"Aviation ordnancemen remove an AIM-7 Sparrow III missile from a Fighter Squadron 32 (VF-32) F-14A Tomcat." NARA & DVIDS Public Domain Archive, Jan. 1, 1990, nara.getarchive.net/media/aviation-ordnancemen-remove-an-aim-7-sparrow-ii i-missile-from-a-fighter-squadron-b 762f6. (Year: 1990).

(Continued)

*Primary Examiner* — Justin Michael Heston

(74) *Attorney, Agent, or Firm* — Norton Rose Fulbright Canada LLP

(57) ABSTRACT

An on-ground aircraft service system includes an aircraft including a first sustainable energy module and a repository including a second sustainable energy module for replacing the first sustainable energy module when the first sustainable energy module is depleted. The aircraft includes a connector operable between an engaged mode operatively connecting the first sustainable energy module to a rest of the aircraft, and a disengaged mode operatively disconnecting the first sustainable energy module from the rest of the aircraft.

20 Claims, 13 Drawing Sheets

(51) Int. Cl.
*B64F 1/36* (2017.01)
*B64F 5/40* (2017.01)

(56) References Cited

U.S. PATENT DOCUMENTS

| | | | |
|---|---|---|---|
| 8,511,613 | B2 | 8/2013 | Droney |
| 8,727,271 | B2 | 5/2014 | Salyer |
| 8,967,529 | B1 | 3/2015 | Bennett |
| 9,108,730 | B2 | 8/2015 | Grossman |
| 9,174,741 | B2 | 11/2015 | Suntharalingam et al. |
| 9,193,451 | B2 | 11/2015 | Salyer |
| 9,346,560 | B2 | 5/2016 | Wang |
| 9,527,605 | B1 | 12/2016 | Gentry |
| 9,550,582 | B2 | 1/2017 | Wang |
| 9,776,714 | B2 | 10/2017 | Shapery |
| 9,873,408 | B2 | 1/2018 | Capizzo |
| 10,153,636 | B1 | 12/2018 | Vander Lind et al. |
| 10,453,348 | B2 | 10/2019 | Speasl |
| 10,988,253 | B2 | 4/2021 | Perry et al. |
| 11,682,917 | B1 | 6/2023 | Piasecki |
| 11,828,417 | B2 | 11/2023 | Clarke et al. |
| 11,993,161 | B2 | 5/2024 | Johnson |
| 12,162,626 | B2 | 12/2024 | Wankewycz |
| 2004/0211862 | A1 | 10/2004 | Elam |
| 2008/0011900 | A1 | 1/2008 | Quintana |
| 2008/0017426 | A1 | 1/2008 | Walters et al. |
| 2010/0065691 | A1 | 3/2010 | Droney |
| 2010/0097183 | A1 | 4/2010 | Pollema |
| 2013/0168499 | A1 | 7/2013 | Grossman |
| 2017/0096075 | A1 | 4/2017 | Henry et al. |
| 2017/0283090 | A1 | 10/2017 | Miller |
| 2017/0327091 | A1 | 11/2017 | Capizzo |
| 2017/0341725 | A1 | 11/2017 | Skahan |
| 2018/0290746 | A1 | 10/2018 | Hanna et al. |
| 2019/0033932 | A1 | 1/2019 | Ku |
| 2020/0172245 | A1 | 6/2020 | Thrun |
| 2020/0290742 | A1 | 9/2020 | Kumar et al. |
| 2020/0346555 | A1 | 11/2020 | Bernhardt |
| 2022/0009648 | A1 * | 1/2022 | Clarke ................... B64D 37/06 |
| 2022/0041299 | A1 * | 2/2022 | Wankewycz ........... B64D 37/30 |
| 2022/0074548 | A1 * | 3/2022 | Clarke .............. H01M 8/04425 |
| 2022/0144125 | A1 | 5/2022 | Cho |
| 2022/0204154 | A1 * | 6/2022 | Roe ........................... B64C 3/32 |
| 2022/0379747 | A1 | 12/2022 | Johnson |
| 2025/0010757 | A1 | 1/2025 | Lachance |

FOREIGN PATENT DOCUMENTS

| | | | |
|---|---|---|---|
| JP | 2015137092 | A | 7/2015 |
| JP | WO2017126584 | A1 | 12/2018 |
| KR | 20170097482 | A | 8/2017 |
| WO | 2012/052511 | A1 | 4/2012 |
| WO | 2018058137 | A1 | 3/2018 |
| WO | 2018099856 | A1 | 6/2018 |
| WO | 2019028071 | A1 | 2/2019 |
| WO | 2019186118 | A1 | 10/2019 |
| WO | 2021046769 | A1 | 3/2021 |

OTHER PUBLICATIONS

"Tronair 04-6031-0100 Falcon 900 / 900EX Battery Lift | PilotJohn GSE." Wayback Machine, archived on May 9, 2021 at web.archive.org/web/20210509073938/https://pilotjohn.com/new/tronair/04-6031-0100. (Year: 2021).

European Patent Office, Extended European Search Report for European Patent Application No. EP22173738.0, Sep. 26, 2022.

European Patent Office, Communication re. extended European search report for European patent application No. 25194992.1, Sep. 26, 2025.

European Patent Office, Communication re: extended European search report mailed May 19, 2026 re: European Patent Application No. 26153051.3.

* cited by examiner

ON-GROUND AIRCRAFT SERVICE SYSTEM

CROSS REFERENCE TO RELATED APPLICATION(S)

The present application is a continuation-in-part of U.S. patent application Ser. No. 18/646,108 filed on Apr. 25, 2024 and incorporated herein by reference, which is a continuation of U.S. patent application Ser. No. 17/322,739 filed on May 17, 2021 and issued as U.S. Pat. No. 11,999,509, and incorporated herein by reference.

TECHNICAL FIELD

This disclosure relates to systems and methods for sustainable aircraft.

BACKGROUND

There is always a need to improve aircraft propulsion systems, integration, and safety, including for improved energy source integration into aircraft and related ground operations.

SUMMARY

In one aspect, the disclosure describes an on-ground aircraft service system comprising:

an aircraft including:

a first sustainable energy module; and a connector operable between: an engaged mode operatively connecting the first sustainable energy module to a rest of the aircraft; and a disengaged mode operatively disconnecting the first sustainable energy module from the rest of the aircraft; and a repository including a second sustainable energy module for replacing the first sustainable energy module when the first sustainable energy module is depleted.

The connector may be operable to operatively connect the first sustainable energy module to a wing of the aircraft. The first sustainable energy module may be removable from the wing by downward movement of the first sustainable energy module relative to the wing.

The connector may be operable to operatively connect the first sustainable energy module to a wing of the aircraft. A transition of the connector to the disengaged mode may permit a removal of the first sustainable energy module from the wing by downward movement of the first sustainable energy module relative to the wing.

In the disengaged mode, the connector may be operable to permit removal of the first sustainable energy module from the wing solely through gravity acting on the first sustainable energy module.

In the engaged mode of the connector, the first sustainable energy module may be received inside a receptacle formed in the wing of the aircraft. The downward movement of the first sustainable energy module relative to the wing may cause withdrawal of the first sustainable energy module from the receptacle.

The first sustainable energy module may include a vessel containing compressed hydrogen.

The first sustainable energy module may include a vessel containing liquid hydrogen.

The on-ground aircraft service system may comprise one or both of a propulsor and an auxiliary power unit powered by the first sustainable energy module. In some embodiments, at least one of the one or both of the propulsor and the auxiliary power unit may be disposed in a same section of the aircraft as the first sustainable energy module.

The first sustainable energy module may be disposed at least partially within a vertical projection of an outline of the at least one of the one or both of the propulsor and the auxiliary power unit.

The aircraft may include a liquid fuel tank for containing a liquid fuel. The at least one of the one or both of the propulsor and the auxiliary power unit may be operable on the liquid fuel.

The at least one of the one or both of the propulsor and the auxiliary power unit may be switchable between operation on the liquid fuel and operation on the first sustainable energy module.

The at least one of the one or both of the propulsor and the auxiliary power unit may be switchable between operation on the liquid fuel and operation on the first sustainable energy module during flight.

The on-ground aircraft service system may comprise a ground vehicle structured to:

removably receive the first sustainable energy module from the aircraft while the aircraft is on-ground and stationary, and while the connector is in the disengaged mode;

deliver the first sustainable energy module to the repository;

removably receive the second sustainable energy module; and deliver the second sustainable energy module to the aircraft for operatively connecting the second sustainable energy module to the aircraft in place of the first sustainable energy module.

The ground vehicle may be structured to lower the first sustainable energy module from the rest of the aircraft.

The ground vehicle may be structured to raise the second sustainable energy module toward the rest of the aircraft.

The aircraft may be a first aircraft. The connector may be a first connector. The on-ground aircraft service system may include a second aircraft that is of a different model than the first aircraft. The second aircraft may include a second connector operable to operatively connect the first sustainable energy module of the first aircraft to a rest of the second aircraft for powering a system of the second aircraft.

The second sustainable energy module may be one of a plurality of second sustainable energy modules included in the repository. The ground vehicle may be structured to removably receive and transport any one of the plurality of second sustainable energy modules.

The first sustainable energy module and the plurality of second sustainable energy modules may be vessels containing hydrogen.

The first sustainable energy module and the plurality of second sustainable energy modules may be vessels containing liquid hydrogen.

The first sustainable energy module and the plurality of second sustainable energy modules may be vessels containing gaseous hydrogen.

Embodiments may include combinations of the above features.

Further details of these and other aspects of the subject matter of this application will be apparent from the detailed description included below and the drawings.

DESCRIPTION OF THE DRAWINGS

So that those skilled in the art to which the subject disclosure appertains will readily understand how to make and use the systems and methods of the subject disclosure without undue experimentation, embodiments thereof will be described in detail herein below with reference to certain figures, wherein.

DETAILED DESCRIPTION

Figure 1:
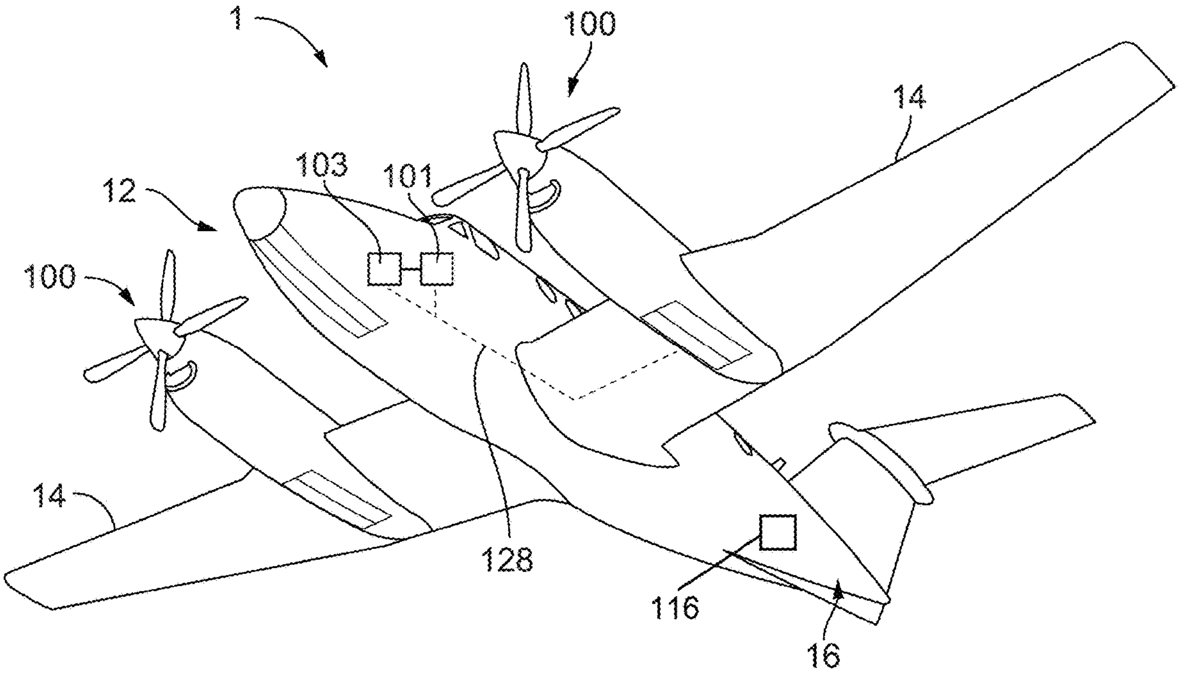
FIG. 1 is a schematic perspective view of an embodiment of an aircraft constructed in accordance with at least one aspect of the present disclosure, showing at least one location for an energy module.

Reference will now be made to the drawings wherein like reference numerals identify similar structural features or aspects of the subject disclosure. For purposes of explanation and illustration, and not limitation, a partial view of an embodiment of a power system in accordance with the disclosure is shown in FIG. 1 and is designated by reference character 100. Other embodiments of systems in accordance with the disclosure, or aspects thereof, are provided in FIGS. 2A-15, as will be described.

The present disclosure relates to on-ground aircraft service systems and methods that permit the replacement of a depleted (e.g., sustainable, renewable, rechargeable) energy module onboard an aircraft. In some embodiments, the aircraft includes a first energy module and a connector operable between an engaged mode operatively connecting the first energy module to a rest of the aircraft, and a disengaged mode operatively disconnecting the first energy module from the rest of the aircraft. In some embodiments, the on-ground aircraft service systems may include a repository including one or more second energy modules that are available for replacing the first energy module onboard the aircraft when the first energy module is depleted.

The systems and methods described herein can also be used to recharge electrical or chemical energy module(s) of aircraft, such as battery(ies) or fuel tanks, while an aircraft is on a horizontal ground and/or swap out a power system(s) in between flights of the aircraft, such as for example a depleted electric power system(s) of an aircraft with a compatible pre-charged power system(s). In some embodiments, an electric power system according to the present technology may be configured to be charged without being removed from the aircraft, such as for example by a vehicle, in some embodiments via quick connect(s) on the power system and corresponding quick connect(s) on the vehicle.

Moreover, the systems and methods can be used to swap depleted power systems (or energy modules) onboard an aircraft with ready-to-fly (e.g., recharged) power systems (or energy modules) from a repository, such as a repository at the airport at which the aircraft has landed. Such systems and methods may help reduce time on ground of such aircraft. The methods may include swapping out a power system (or energy module) that is depleted and/or that requires maintenance with a compatible ready-to-fly power system (or energy module), such as for example between flights of a given aircraft in which case time on ground and/or a difficulty of maintenance of the power system requiring maintenance may be reduced. Such power systems may include one or more energy modules and an energy converter that is operable to convert energy from the energy module(s) to energy/work for powering one or more energy-consuming systems of the aircraft. Such energy converter may include an electric motor, a thermal (e.g., gas turbine, piston, rotary) engine and/or a fuel cell. Such energy converter may be a propulsor of the aircraft or an auxiliary power unit of the aircraft that provides energy for functions other than propulsion of the aircraft.

The term "connected" may include both direct connection (in which two elements that are connected to each other contact each other) and indirect connection (in which at least one additional element is located between the two elements). The term "substantially" as used herein may be applied to modify any quantitative representation which could permissibly vary without resulting in a change in the basic function to which it is related.

Shown in FIG. 1, an aircraft 1 includes a fuselage 12, wings 14, a tail 16, two power systems 100 and a controller 101. The controller 101 is operatively connected to the power systems 100. In this embodiment, the controller 101 is implemented as a single unit of hardware onboard the aircraft 1 which controls both of the power systems 100 of the aircraft 1. It is contemplated that any other embodiment of the controller 101 may be used and that the controller 101 may be implemented as any suitable hardware, including conventional hardware. For example, in some embodiments, each of the power systems 100 may include a controller onboard (i.e., integrated with) that power system 100.

Still referring to FIG. 1, in this embodiment the aircraft 1 includes an electrically powered system 103. In some embodiments, the electrically powered system 103 is a control module in the cockpit of the aircraft 1, is operatively connected to the controller 101, and is operable by the pilot(s) to execute various functions with respect to the power systems 100. In some embodiments, the electrically powered system 103 may be different. For example, in some embodiments the electrically powered system 103 may be one or more electric machines, such as electric motors driving one or more air movers to generate thrust for propelling the aircraft 1. In some embodiments, the electrically powered system 103 may be an electric power source that is remote to the power system 100 and which may provide electrical power to the power system 100 in at least some embodiments and operating modes of the aircraft 1. In some embodiments, the electrically powered system 103 may be omitted. In some embodiments, the aircraft 1 may have multiple different electrically powered systems 103, one or more of which may be a consuming system that is powered by the power system(s) 100 of the aircraft 1.

In the present embodiment, the electrically powered system 103 is a control module which may be implemented as any suitable hardware, including conventional hardware. In this embodiment, the controller 101 is configured to, when in use, in response to a command by the pilot(s) of the aircraft 1 and/or via a command received from a suitable connection established to the controller 101 from a remote device of maintenance personnel while the aircraft 1 is stationary on the horizontal ground, send a signal, such as any suitable electronic signal via a wired and/or wireless connection, to one or more connectors such as connector module(s) 114*c* (shown in FIG. 2A) associated with one of, each of, or both of the power systems 100 (depending on the number of power systems 100 of the particular embodiment of aircraft 1) to operate the connector module(s) 114*c* to disengage the one of, each of, or both of the power systems 100 from the aircraft 1, respectively.

In some embodiments, the power systems 100 may each have a dedicated controller 101, for example instead of the common controller 101 in the present embodiment, configured to provide for the functionality described herein. The controller(s) 101 may be operable via a remote connection, which may be wired or wireless, to execute various functions with respect to the power systems 100. For example, in a particular embodiment, the aircraft 1 may include a suitable wired connector and/or a suitable wireless module via which the controller 101 may be configured to be connected to and operated from a remote device while the aircraft 1 is on the ground.

Figure 2A:
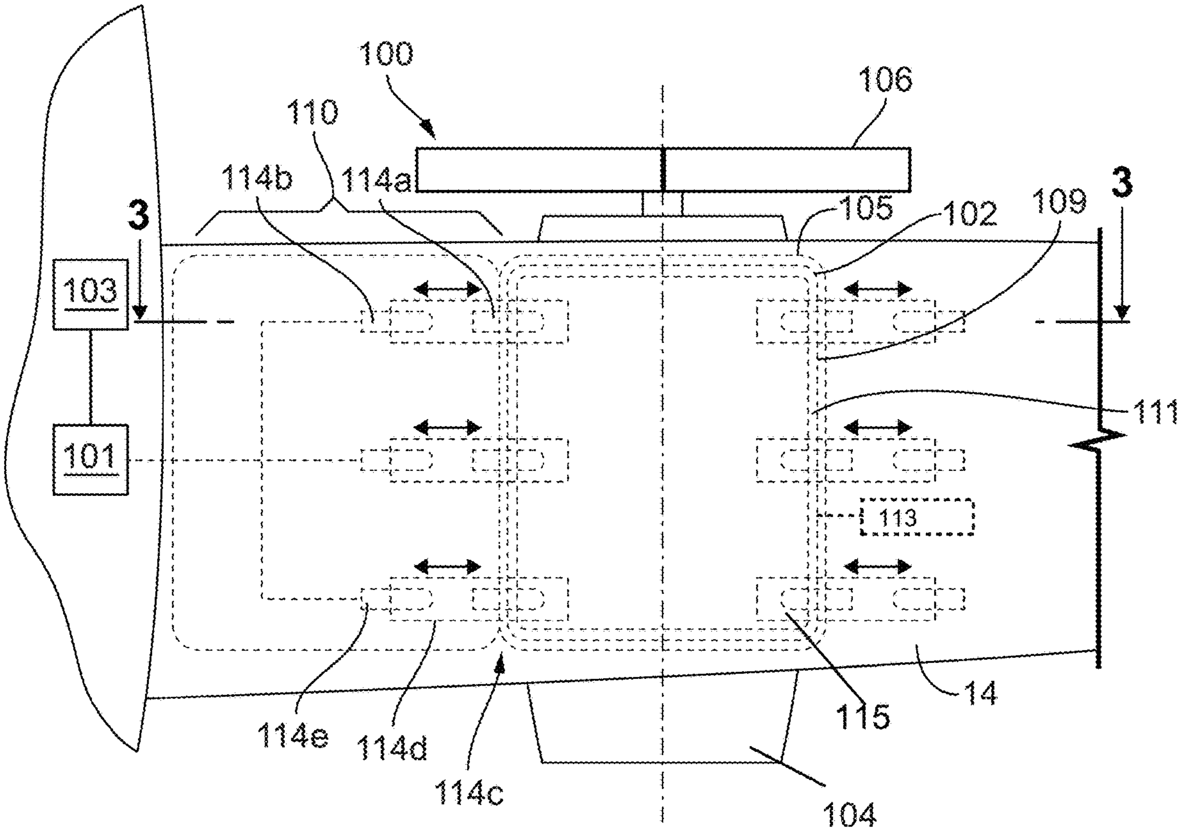
FIG. 2A is a schematic top down partial view of the aircraft of FIG. 1, showing an embodiment of an energy module mounted with an aircraft power system to an aircraft.

In the present embodiment, the controller 101 is operatively connected to the connector module 114*c* associated with each of the power systems 100. As shown in FIG. 2A with respect to one of the two similar power systems 100, in this embodiment each of the two connector modules 114*c* includes a plurality of actuators 114*d* on each of two opposite sides of an energy module 108 of the corresponding power system 100. As shown, in this embodiment each of the actuators 114*d* is operatively connected to a movable member 114*e*. Each of the actuators 114*d* is configured to move its movable member 114*e* between an engaged position 114*a* and a disengaged position 114*b*. In this embodiment, the movable members 114*e* are slidable between their respective engaged positions 114*a* and disengaged positions 114*b*. It is contemplated that other types of movable members may be used to provide for the functionality described herein. For example, it is contemplated that in some embodiments, pivoting members may be used. Yet other types of movable members, including a single movable member per power system 100 and a combination of different two or more types of movable members per power system 100, are likewise contemplated.

Figure 3A:
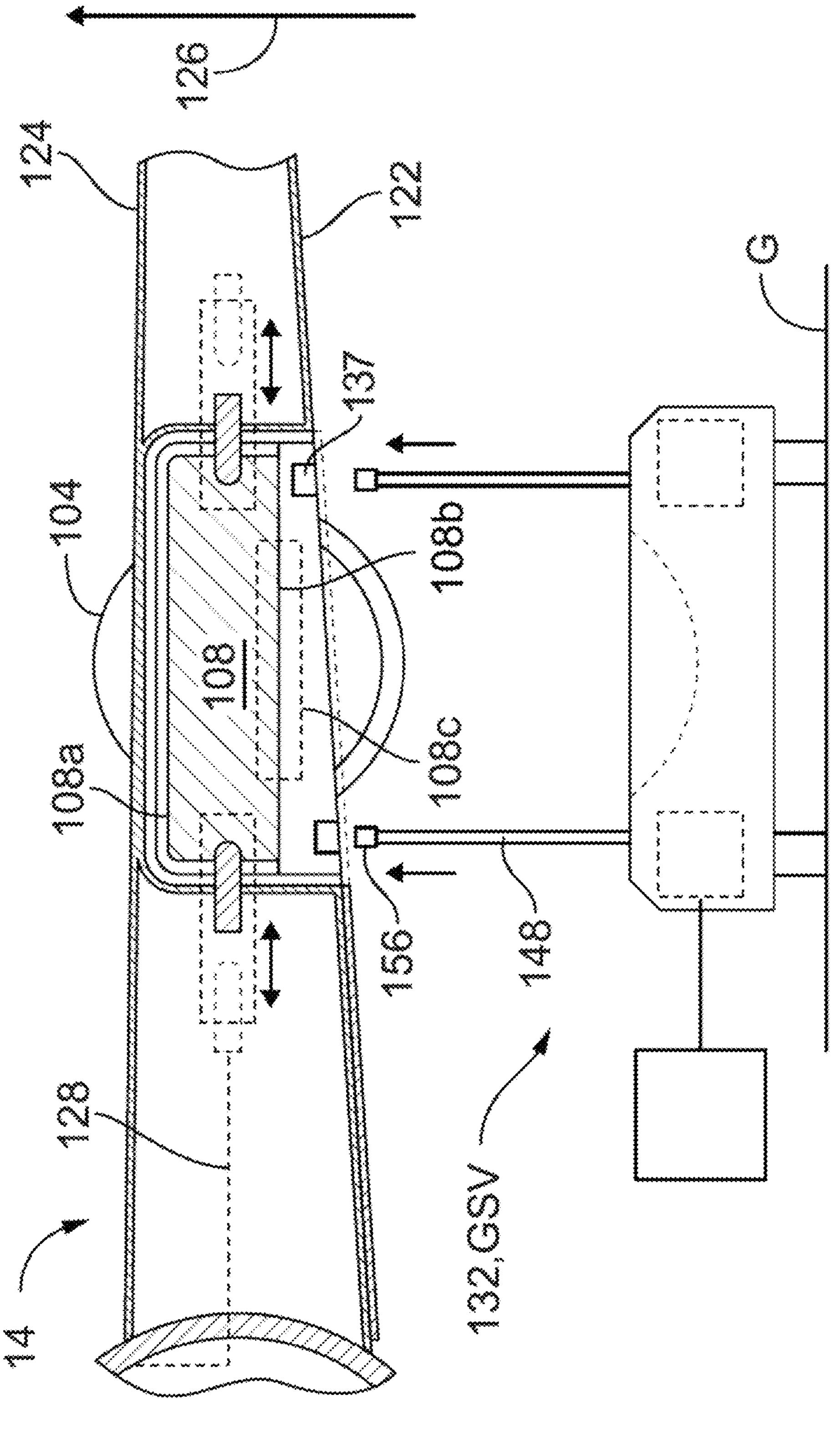
FIG. 3A is a schematic cross sectional side view of the aircraft power system of FIG. 2A, showing an embodiment of mounting the power system within the aircraft.

As shown in FIGS. 2A and 3A, in the present embodiment in the engaged position 114*a* the movable members 114*e* extend into corresponding mating female structures 115, which in this non-limiting embodiment are mating female apertures 115, in the energy module 108 and thereby secure/engage the energy module 108, and the power system 100, to the aircraft 1. Other corresponding mating structures, depending on each particular type/combination of movable member(s), are likewise contemplated.

As shown in FIGS. 2A and 3A, in this particular embodiment where energy module 108 includes an electric energy source, and not in all embodiments, one or more of the movable members 114*e* include conducting wires 128 and one or more of the mating apertures corresponding to the one or more of the movable members 114*e* are electrically connected to the energy module 108. The energy module 108 is thereby electrically connected to the electrically powered system 103 (in this embodiment controller 101) to power the electrically powered system 103. In other embodiments, the conducting wire(s) 128 and hence the selective electrical connection between the energy module 108 and the electrically powered system 103 may be omitted of may be achieved separately (e.g., independently) from movable members 114*e*.

Further as shown in FIGS. 2A and 3A, in the disengaged position 114*b* the movable members 114*e* of the connector module 114*c* are disposed outside of the corresponding mating apertures in the energy module 108 and thereby disengage the energy module 108 from the rest of aircraft 1, allowing the power system 100 to be removed from the aircraft 1. More particularly, still referring to FIGS. 2A and 3A, in the present embodiment the power system 100 is received in a cavity/receptacle 105 having a substantially conforming geometry. Even more particularly in this embodiment, and not in all embodiments, the power system 100 includes an electric machine 104 attached to the (i.e., electric) energy module 108 and electrically connected to the energy module 108 via a plurality of electric conductors 108*c*. More particularly, in this embodiment the electrical connection is to battery cells of the energy module 108. The battery cells may be of any suitable type and are therefore not shown. It is contemplated that the energy module 108 may include different types of sustainable electric energy sources such as capacitor(s) including super-capacitors, ultra-capacitors, fuel cell(s), or the like, to provide for the functionality described herein. As explained below, chemical energy modules may also be used.

As shown in FIG. 3A, in this particular embodiment, a majority of each of the conductors 108*c* is disposed in its entirety mechanically (as distinct from merely electrically) between the electric machine 104 and the energy module 108. Even more particularly in this particular embodiment, an entirety of each of the conductors 108*c* is disposed in its entirety mechanically (as distinct from merely electrically) between the electric machine 104 and the energy module

108. In some embodiments, the electric connection between the electric machine 104 and the energy module 108 can be a direct electrical connection via conductors 108*c*, which may allow for a shorter length, lower overall weight of the conductors 108*c*, and lower energy (e.g., ohmic) losses. In some embodiments, this may allow for a higher current, and hence more power transfer between the energy module 108 and the electric machine 104 at a given overall weight of the conductors 108*c*, compared to systems in which an electric machine powered by an electric energy source is remote from the electric energy source. In embodiments where the energy module 108 contains a gaseous or liquid fuel for example, fluid connections may convey the fuel to a thermal engine for example. As seen in FIG. 2A, in this embodiment the electric machine 104 is operatively connected to an air mover such as propeller 106 to drive the propeller 106.

Thus, the electrical connection provided by the conductors 108*c* may allow for a more efficient electric power transfer between the energy module 108 and the electric machine 104. For example, at takeoff, for a given acceptable overall weight of the conductors 108*c*, more electrical power may be supplied from the energy module 108 to the electric machine 104 and thus more thrust may be generated by the propeller 106. As another example, in some embodiments the controller(s) 101 associated with the power system 100 and the electric machine 104 may be configured to operate the power system 100 in an energy recuperation mode by windmilling the propeller 106 (which is just one example of an air mover that the power system 100 may use) to drive the electric machine 104 as an electrical energy generator and thereby charge the energy module 108.

Figure 2B:
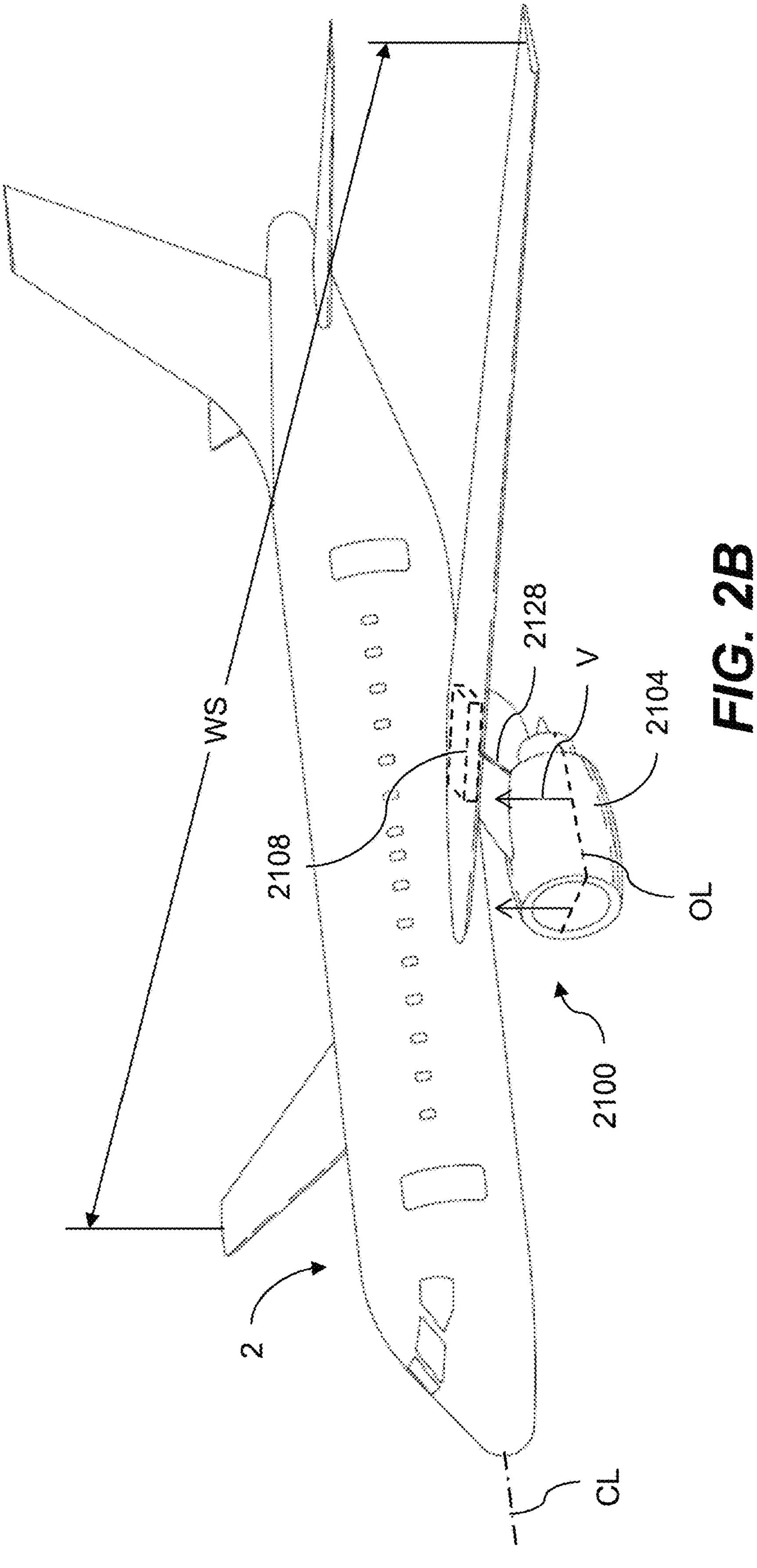
FIG. 2B is a schematic perspective view of another exemplary aircraft showing another location for an energy module.

FIG. 2B is a schematic perspective view of another exemplary (e.g., fixed wing) aircraft 2 showing another location for energy module 2108. Aircraft 2 may have centerline CL, which may correspond to a roll axis of aircraft 2. Aircraft 2 may include wingspan WS extending from the tip of one wing to the tip of the other wing. Centerline CL may bisect wingspan WS. Aircraft 2 may include another embodiment of the power system 100, referred to as power system 2100, which may have elements in common with other power systems disclosed herein. Power system 2100 may include energy converter 2104 operatively connected to energy module 2108. Energy module 2108 may be electric or chemical (e.g., fuel based) and be in electric or fluid communication with energy converter 2104 via fluid or electric connection(s) 2128 (e.g., fluid conduit(s) or electric cable(s)). Energy converter 2104 may be operable as a propulsor for aircraft 2. Alternatively, energy converter 2104 may be operable as an auxiliary power unit and may be operable solely for powering non-propulsion functions of aircraft 2. In some embodiments, energy converter 2104 may be a thermal engine operating on fuel from energy module 2108. In some embodiments, energy converter 2104 may be an electric motor that is powered by electricity from energy module 2108.

To promote relatively short connection(s) 2128, energy module 2108 may be disposed proximate to energy converter 2104. In some embodiments, a length of connection(s) 2128 between energy module 2108 and energy converter 2104 may be equal to or less than about 3 metres (e.g., less than 10 feet). For example, the length of connection(s) 2128 between energy module 2108 and energy converter 2104 may be from 0 to 3 metres (0 to 9.8 feet), from 1 to 3 metres (3.3 to 9.8 feet), or from 2 to 3 metres (6.6 to 9.8 feet). In some embodiments, the length of connection(s) 2128 between energy module 2108 and energy converter 2104 may be equal to or less than about 1 metre (e.g., less than 3 feet). For example, the length of connection(s) 2128 between energy module 2108 and energy converter 2104 may be from 0 to 1 metre (0 to 3.3 feet), or from 0.5 to 1 meter (1.6 to 3.3 feet).

The distance and length of connection(s) 2128 between energy module 2108 and energy converter 2104 may be expressed in terms of proportions relative to the size of aircraft 2. For example, the length of connection(s) 2128 between energy module 2108 and energy converter 2104 may be less than 30% of half of wingspan WS, less than 25% of half of wingspan WS, less than 20% of half of wingspan WS, less than 15% of half of wingspan WS, less than 10% of half of wingspan WS, or less than 5% of half of wingspan WS. In various embodiments, the length of connection(s) 2128 between energy module 2108 and energy converter 2104 may be from 0% to 30% of half of wingspan WS, from 0% to 25% of half of wingspan WS, from 0% to 20% of half of wingspan WS, from 0% to 15% of half of wingspan WS, from 0% to 10% of half of wingspan WS, from 0% to 5% of half of wingspan WS.

In some embodiments, connection(s) 2128 between energy module 2108 and energy converter 2104 may be established via one or more pairs of cooperating (e.g., fluid, electric) connectors that are connected directly together where each pair of connectors include a first connector mounted directly to (i.e., at 0 meter from) energy module 2108 and a second connector mounted directly to (i.e., at 0 meter from) energy converter 2104 so that a length of connection(s) 2128 between energy module 2108 and energy converter 2104 may effectively be 0 metre (i.e., nil). The first and second connectors may be connected (e.g., mated) directly to each other in a plug-in fashion without the need for a fluid conduit and/or an electric cable operatively connected therebetween.

In some embodiments, energy module 2108 may be disposed above or below energy converter 2104 relative to an upright orientation of aircraft 2 (e.g., when aircraft 2 is stationary on the ground G). For example, energy module 2108 may be disposed at least partially within a vertical projection of outline OL of energy converter 2104. Outline OL of energy converter 2104 may be an outer profile of energy converter 2104 taken in a horizontal plane that is normal to vertical direction V. Outline OL may define a footprint of energy converter 2104 in that horizontal plane and energy module 2108 may partially overlap a vertical projection of that footprint. In some embodiments, energy module 2108 may be entirely contained within the vertical projection of outline OL.

Returning to FIG. 3A, the power system 100 in this embodiment further includes electrical connectors 137 positioned on a side of the power system 100 that faces toward the ground G when the aircraft 1 is stationary on the ground G. The electrical connectors 137 are electrically connected to the energy module 108 and are sized to charge the energy module 108 when connected to an electric power source, such as one that may be provided via a ground service vehicle (GSV) for example.

Still referring to FIG. 3A, the electrical connectors 137 are on a bottom side 108*b* of the power system 100. In this embodiment, the energy module 108 is positioned relative to the aircraft 1 such that when the connector module 114*c* is in the disengaged mode (i.e. the movable members 114*e* are in the disengaged position 114*b* in this embodiment) and the aircraft 1 is stationary on the ground G, gravity acts on the power system 100 to move the power system 100 toward the ground G and this may make removal of the power system 100 from the aircraft 1 easier in some cases. In this embodiment, and not necessarily in all embodiments, the electrical connectors 137 are part of the electric machine 104. In other embodiments, such as where the power system 900 in FIG. 9, the electrical connectors 137 are part of the energy module 108. Other positioning and combinations of electrical connectors 137, where these are present, are likewise contemplated. It is likewise contemplated that in some embodiments, a single electrical connector 137 may be used.

The electric machine 104 can be configured to consume electrical energy to drive a component, (e.g. act as an electric motor) and/or convert mechanical energy into electrical energy (e.g. act as a generator). For example, in certain embodiments the "electric machine" can be an electric motor, and not a generator, while in other embodiments the electric machine 104 may be configured in certain flight conditions to permit windmilling to generate energy. In some embodiments, electric machine may be operable as a motor and as a generator.

The energy source 108 is electrically connected to exchange electrical power with the electric machine 104. The electrical energy module includes a top side 108*a*, a bottom side 108*b*, where the bottom side 108*b* faces the ground G when the electrical energy module 108 is in a housing 102.

It is contemplated that the electrical connector module 110 can operatively and electrically connect the electric machine 104 to the energy module 108. The electrical connector module 110 can include one or more conductors (e.g. conductor 108*c*), one or more controllers (e.g. controller 101), and any other suitable components, some or all of which may be conventional and which may be selected using conventional engineering techniques to suit each particular embodiment of the power system 100 and enable its operation as described herein. It is contemplated that, while in illustrated embodiments the connector module 110 is an active (e.g. powered) module, in other embodiments the electrical connector module 110 may be a manually operated (e.g. not powered) module.

As shown in FIG. 3A for example, in some embodiments, the receptacle 105 can be defined in the wing 14, such that the receptacle 105 passes through at least a bottom surface 122 of the wing 14. For example, as shown in FIG. 2A, the receptacle 105 can extend only partly through the wing 14, bound on a top side by a top surface 124 of the wing 14, opposite the bottom surface 122. In some such embodiments, the surfaces 122, 124 of the wing 14 define an airfoil shape with an upward lift direction 126.

Figure 3B:
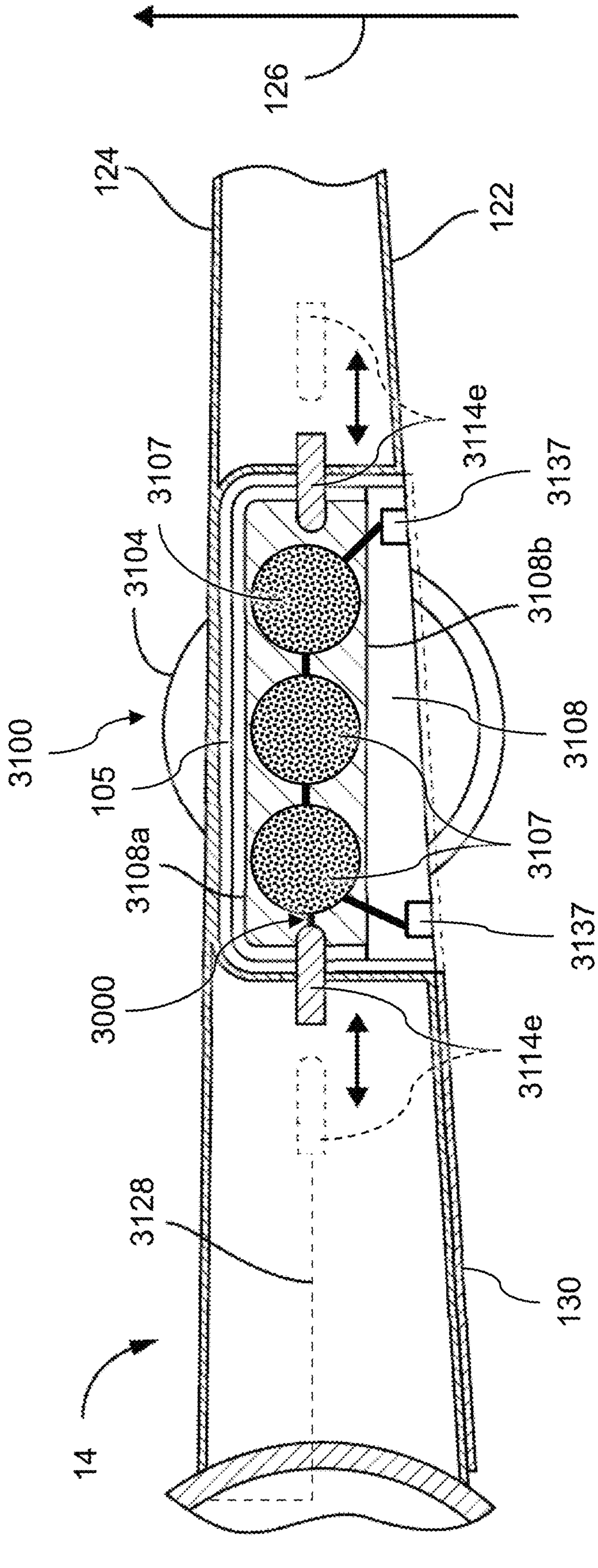
FIG. 3B is a schematic cross sectional side view of another aircraft power system including a sustainable energy module.

FIG. 3B is another schematic cross sectional side view of another embodiment of the power system 100, referred to as power system 3100 including energy module 3108 including one or more vessels 3107 containing fuel. Power system 3100 may include elements of power system 100 described above and like elements are identified using like reference numerals that have been incremented by 3000. Wing 14 may include receptacle 105 defined therein. In some embodiments, power system 3100 may include one or more thermal engines 3104 which consume combustible fuel and drives propeller 106. In some embodiments, power system 310 may include one or more fuel cells which use chemical energy of hydrogen or other fuel to produce electricity for driving an electric motor which in turn drives propeller 106. Accordingly, energy module 3108 may contain chemical energy stored in fuel in fluid form that is used to drive power system 3100.

In some embodiments, hydrogen in gaseous or in liquid form may be stored in vessel(s) 3107. In some embodiments, energy module 3108 may include one or more pressure vessels 3107 configured to contain a compressed fuel such as hydrogen. In some embodiments where the fuel stored in vessel(s) 3107 is pressurized, vessel(s) 3107 may be structured as suitable pressure vessel(s). In some embodiments, energy module 3108 may include one or more vessels 3107 each having a cylindrical shape. In embodiments where energy module 3108 includes a plurality of vessels 3107, such vessels 3107 may be in (selective or permanent) fluid communication with each other.

In some embodiments, energy module 3108 may store a sustainable (e.g., aviation) fuel, which may be an alternative fuel made from non-petroleum feedstocks and that is intended to reduce emissions from air transportation. The sustainable fuel may be a cleaner alternative to conventional fossil fuels. In various embodiments, the fuel stored in energy module 3108 may be mainly hydrogen, biogas, hydrotreated vegetable oil, biodiesel or ethanol for example.

Energy module 3108 may include top side 3108*a*, bottom side 3108*b*, where bottom side 3108*b* faces the ground G when energy module 3108 is installed in receptacle 105. In some embodiments, energy module 3108 may be refillable via one or more fill connectors 3137 positioned on bottom side 3180*b* of the power system 3100 that faces toward the ground G when the aircraft 1 is stationary on the ground G. Fill connector(s) 3137 may permit fluid communication between an external fuel source such as GSV and vessel(s) 3107 to permit refilling of vessel(s) 3107 either while energy module 3108 is received in receptacle 105 or when energy module 3108 is removed from receptacle 105. Fill connector(s) 3137 may include one or more couplings that prevent fuel stored in vessel(s) 3107 from inadvertently getting discharged when energy module 3108 is disconnected from the external fuel source.

Energy module 3108 may be fluidly connected to supply fuel to thermal (e.g., gas turbine, piston, rotary) engine 3104 or a fuel cell of power system 3100, which may be a propulsor driven to propel aircraft 1. Alternatively or in addition, energy module 3108 may be fluidly connected to supply fuel to auxiliary power unit 116 (referred hereinafter as "APU 116") via one or more fuel lines 3128. APU 116 may include a thermal engine and/or a fuel cell that provides energy for functions other than propulsion of aircraft 1.

In some embodiments, the transfer of fuel from energy module 3108 to one or more fuel-consuming devices may be achieved via one or more movable members 3114*e* becoming in mating engagement with one or more corresponding discharge connectors 3000 of energy module 3108. The engagement of movable members 3114*e* with energy module 3108 may establish fluid communication from energy module 3108 to one or more fuel-consuming devices via fuel line(s) 3128 or other fuel line(s). Discharge connector(s) 3000 may include one or more couplings that prevent fuel stored in vessel(s) 3107 from getting discharged when energy movable members 3114*e* are disengaged from energy module 3108. Alternatively, the discharge of fuel from energy module 3108 may be achieved via fluid connections that are separate from movable members 3114*e*.

Movable member(s) 3114*e* may define a connector, which may be part of connector module 114 and used to operatively connect energy module 3108 to wing 14 or other part of aircraft 1. For example, the engagement of movable member(s) 3114*e* with energy module 3108 may physically retain energy module 3108 inside of receptacle 105. In some embodiments, the engagement of movable member(s) 3114*e* with energy module 3108 may optionally also provide a fuel supply connection(s) to one or more fuel-consuming systems of aircraft 1. A transition of movable member(s) 3114*e* to a disengaged mode where movable member(s) 3114*e* are disengaged from energy module 3108 may physically release energy module 3108 from receptacle 105 and permit energy module 3108 to be removed (withdrawn) from receptacle 105. In some embodiments, energy module 3108 may be removed from receptacle 105 by lowering energy module 3108 from receptacle 105 so that energy module 3108 may be removed solely through the action of gravity acting on energy module 3108. For example, the downward movement of energy module 3108 relative to wing 14 may cause withdrawal of energy module 3108 from receptacle 105. In some embodiments, the removal of (e.g., depleted) energy module 3108 from receptacle 105 and the installation of a (e.g., replenished) energy module 3018 may be performed with the assistance of GSV 132 or another GSV.

In various embodiments, one or more fuel-consuming systems supplied with fuel from energy module 3108 may be disposed in close proximity to (e.g., in a same section of aircraft 1) as energy module 3108. For example, both thermal engine 3104 and energy module 3108 may be disposed in/on wing 14 of aircraft 1 and may optionally be integrated in the same power system 3100 swappable as a unit. Alternatively or in addition, one or more fuel-consuming systems supplied with fuel from energy module 3108 may be disposed in a different section of aircraft 1 as energy module 3108. For example, APU 116 may be disposed in (e.g., a tail cone section of) fuselage 12 of aircraft 1 and energy module 3108 may be disposed inside of wing 14 of aircraft 1.

In some embodiments, both thermal engine 3104 and energy module 3108 may be incorporated into a same power system 3100, which may be replaceable/swappable as a unit. Alternatively, energy module 3108 may be replaceable/swappable separately from thermal engine 3104. Description of the different configurations and mounting arrangements of power systems and energy modules provided herein are also applicable to power system 3100 and energy module 3108.

Figure 3C:
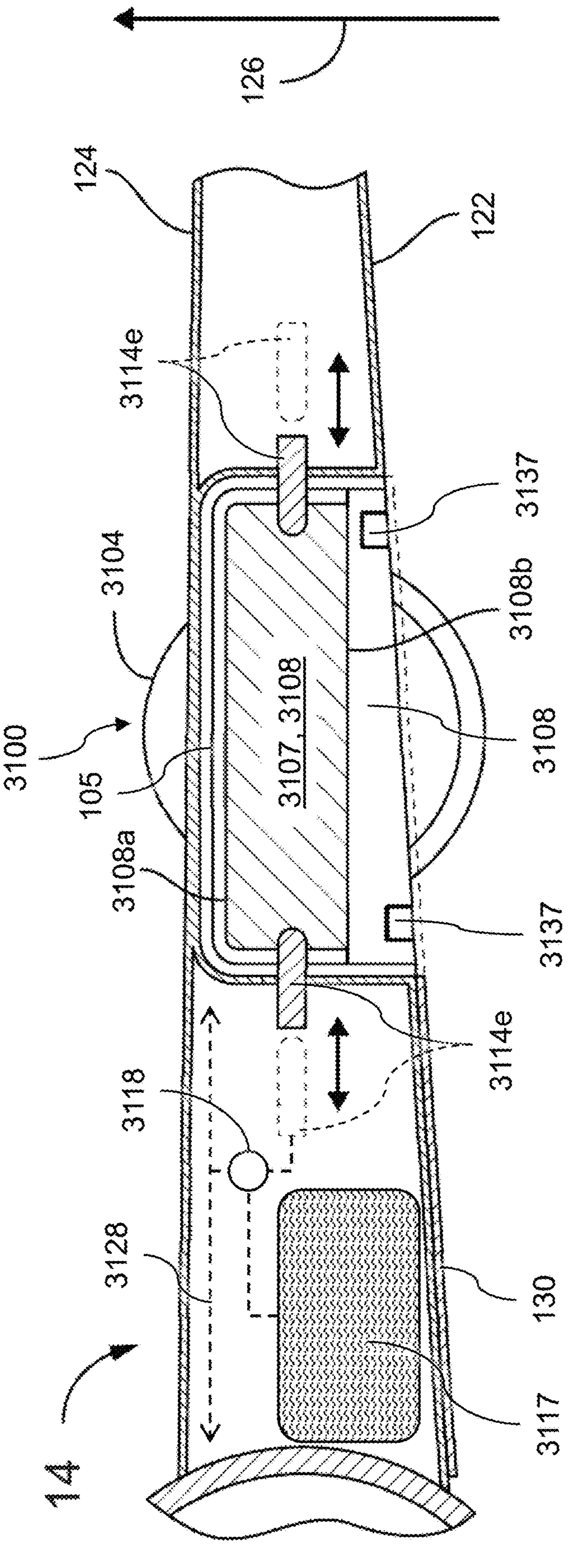
FIG. 3C is a schematic cross sectional side view of the aircraft power system of FIG. 3B and a liquid fuel tank.

FIG. 3C is a schematic cross sectional side view of power system 3100 in conjunction with alternate fuel tank 3117 with some elements of power system 3100 omitted for clarity. Power system 3100 may include energy module 3108 including vessel(s) 3107 containing sustainable (e.g., non-petroleum, non-fossil) fuel. In some embodiments, aircraft 1 may include alternate fuel tank 3117 containing an alternate source of fuel that may be supplied to APU 116 and/or to thermal engine 3104 in some situations. In some embodiments, alternate fuel tank 3117 may contain (e.g., combustible) fuel in liquid form. In some embodiments, alternate fuel tank 3117 may contain jet fuel, also known as "aviation turbine fuel". In some embodiments, alternate fuel tank 3117 may contain a petroleum fuel. Alternate fuel tank 3117 may be disposed inside of wing 14 or other part of aircraft 1. In some embodiments, alternate fuel tank 3117 may be provided in combination with an electric energy module.

APU 116 and/or to thermal engine 3104 may be operable on one or both of fuel from energy module 3108 and fuel from alternate fuel tank 3117. In some embodiments, one or more valves 3118 may be provided to select whether fuel from energy module 3108 or fuel from alternate fuel tank 3117 is supplied to APU 116 and/or to thermal engine 3104 via fuel line(s) 3128. Valve(s) 3118 may be operatively connected to controller 101 so that the fuel source for APU 116 and/or to thermal engine 3104 may be selected automatically or in response to a command from the flight crew. For example, the fuel source may be selected as a function of the phase of operation (e.g., flight) of aircraft 1. In various embodiments, one both of APU 116 and/or to thermal engine 3104 may be switchable between operation on liquid fuel from alternate fuel tank 3117 and fuel from energy module 3108. In some embodiments, one both of APU 116 and/or to thermal engine 3104 may be switchable between operation on liquid fuel from alternate fuel tank 3117 and fuel from energy module 3108 during flight of aircraft 1.

Figure 4:
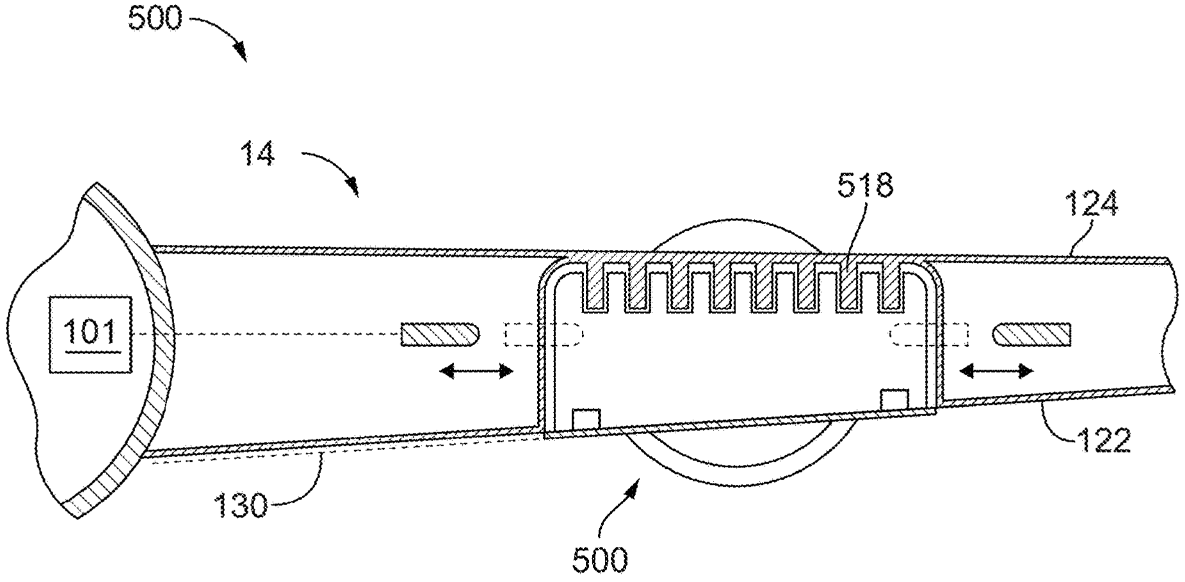
FIG. 4 is a schematic cross sectional side view of the aircraft power system of FIG. 2A, showing an embodiment of a sliding panel.
Figure 5:
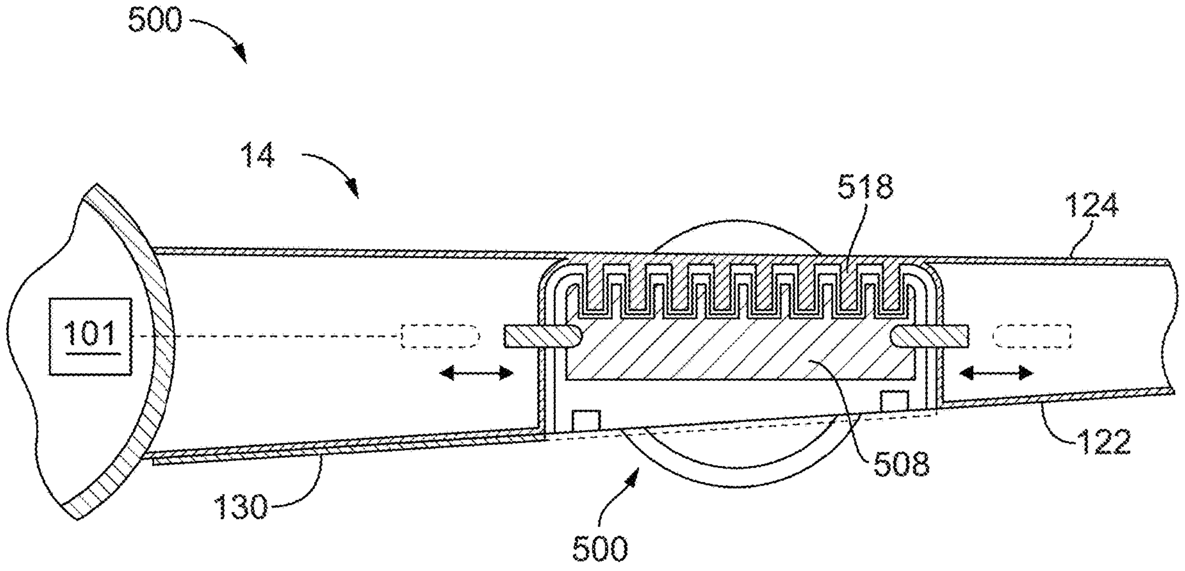
FIG. 5 is a schematic cross sectional side view of the aircraft power system of FIG. 2A, showing another embodiment of mounting the power system within the aircraft.

Referring to FIGS. 4 and 5 now, a different embodiment of the aircraft 1 and a different embodiment of the power system 100 is shown. The wing 14 in this embodiment of the aircraft includes a panel 130 slidingly engaged to the bottom surface 122 of the wing 14 moveable between a closed position (as shown in FIG. 4) and an open position (as shown in FIG. 5). When a power system 100 is positioned in the receptacle 105 of the wing 14, the panel 130 is in the open position. In the absence of a power system 100 from the receptacle 105, the panel 130 is in the closed position and completes the airfoil shape of the bottom surface 122 of the wing 14. In the closed position, the panel 130 may help prevent elements from entering the receptacle 105. To provide for this operation, the panel 130 may be operatively engaged to a suitable powered actuator 113 controllable for example via the controller 101. In other embodiments, to provide for this operation, the panel 130 may be operatively engaged to a suitable passive actuator, such as a spring loaded actuator. Yet other mechanical arrangements that would enable the operation of the panel 130 as described herein are likewise possible and may be implemented using conventional elements and engineering techniques.

Referring to FIG. 5, depending on the size of the aircraft 1, and the size and weight of the power system 100, in some embodiments the wing 14 may include a ribbed structure 518 which may extend into the receptacle 105 and be structured to help support the power system 100 on the wing 14 and help maintain structural integrity of the wing 14. In some such embodiments, a corresponding portion of the power system 100, such as the (e.g., electric, chemical) energy module 508 may have a portion conforming to the shape of the ribbed structure 518. In some such cases, the fit between the conforming portion of the power system 100 and the ribbed structure 518 may allow for a relatively larger power system 100, such as for example a relatively larger energy module 508 with more electrical energy storage capacity.

Figure 6:
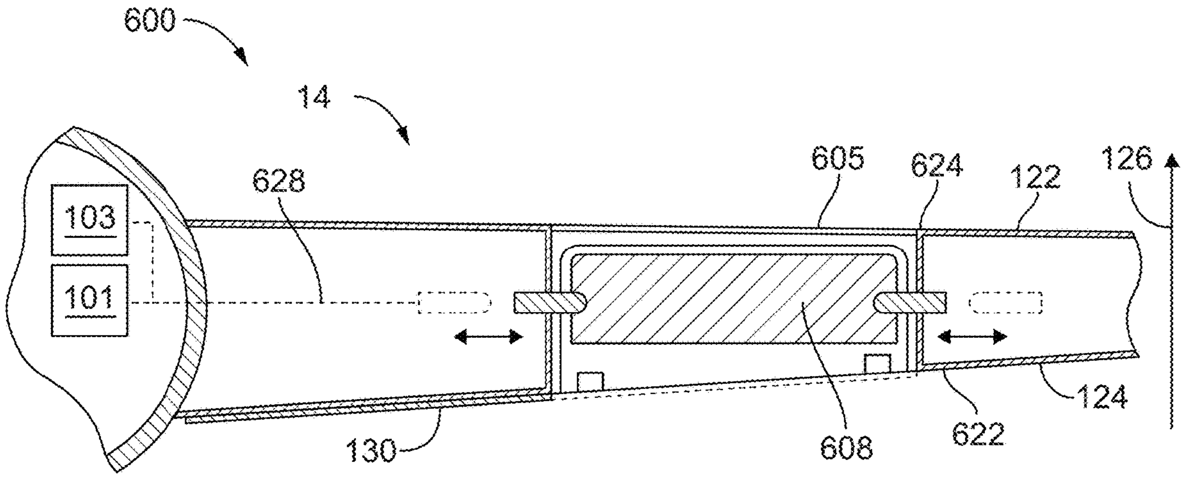
FIG. 6 is a schematic cross sectional side view of the aircraft power system of FIG. 2A, showing another embodiment of mounting the power system within the aircraft.

Referring now to FIG. 6, a power system 600 and wing 14, which is yet another embodiment of the power system 100 and the wing 14, are shown. In this embodiment, the receptacle 605 extends through the wing 14, from the bottom surface 622 of the wing 14 to the top surface 624 of the wing 14. In this embodiment, the structural ribs of the wing 14 are positioned around the receptacle 605, e.g. ribs 818 in FIG. 8 and not necessarily with the varied rib spacing of FIG. 8.

Figure 7:
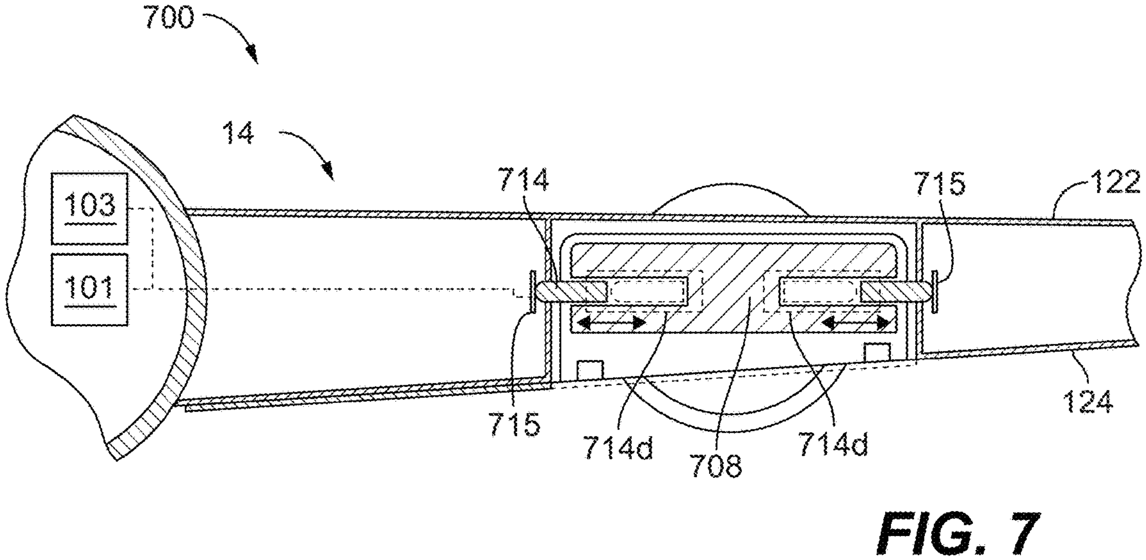
FIG. 7 is a schematic cross sectional side view of the aircraft power system of FIG. 2A, showing another embodiment of mounting the power system within the aircraft.

In certain embodiments, such as shown in FIG. 7, the power system 700 can have any configuration as shown in FIGS. 2A-6, however the movable members 714 and corresponding actuators 714*d* are disposed within the (e.g., electric, chemical) energy module 708. The movable members 714 are configured to be retractable into the energy module 708 by the actuators 714*d* to disengage the power system 700 from contacts 715 of the aircraft 1.

Figure 8:
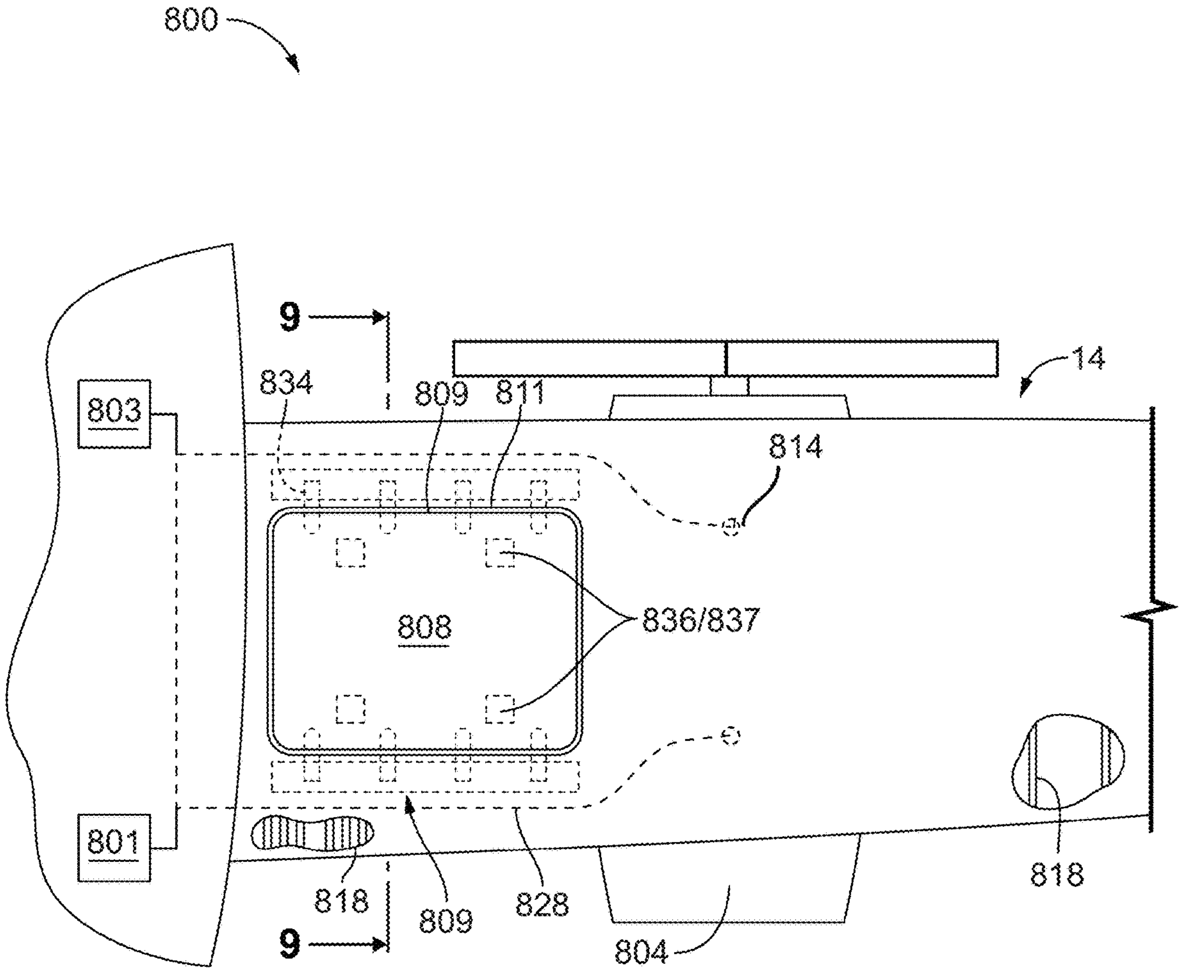
FIG. 8 is a schematic top down view of an embodiment of an aircraft constructed in accordance with at least one aspect of the present disclosure, showing an embodiment of an energy source mounted in an aircraft separate from an electric machine.

As shown in FIGS. 8-11, another embodiment of the power system 100, referred to as power system 800, includes similar features of aircraft power system 100, but the power system 800 excludes electric propulsion machines. Rather, the power system 800 includes the (e.g., electric, chemical) energy module 808 and a connector module 809 that selectively removably engages energy module 808 to a corresponding receptacle 811 in the wing 14. In some such embodiments, the wing ribs 818 may be provided in a higher density proximate the receptacle 811 relative to wing ribs in a remainder of the wing 14 to provide additional structural support. It is contemplated that in other embodiments, the receptacle 811 may be omitted, such that the power system 800 or other embodiments thereof could be attached to the aircraft 1 in a different manner, such as for example to an exterior surface of the aircraft 1. In the embodiment of FIG. 8, the aircraft 1 includes an electric motor 810 that is attached to the wing 14 remote from the power system 800 and is electrically connected to be powered by the power system 800.

In this embodiment, the energy module 808 further includes anchor points 836 defined in top and bottom surfaces **808*a*, 808*b* of the energy module 808, 1008, 1108. The anchor points 836 are structured as load bearing members to support a weight of the power system 800 for removing the power system 800 from the aircraft wing 14**.

Figure 9:
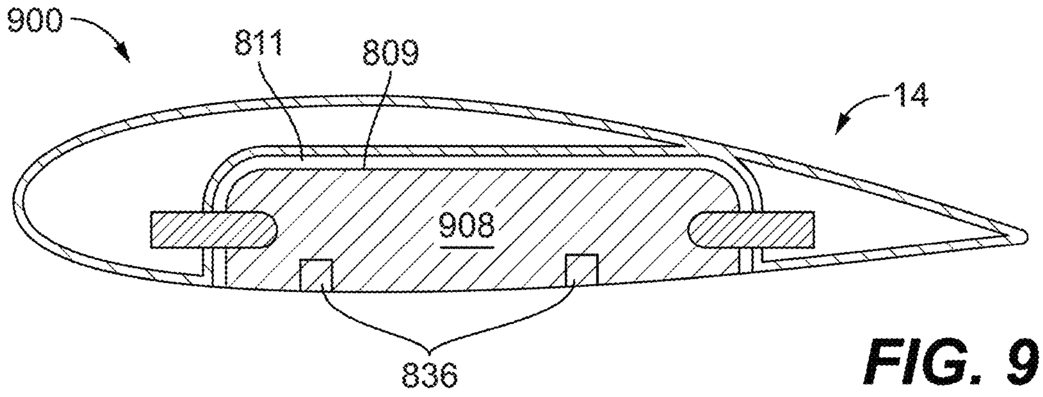
FIG. 9 is a schematic cross sectional side view of the aircraft power system of FIG. 6, showing an embodiment of mounting the energy source within the aircraft.

Referring to FIG. 9, yet another power system 900 is shown. The power system 900 has a bottom surface that is shaped such that it completes the airfoil shape of the wing 14 with which it is flush.

Figure 10:
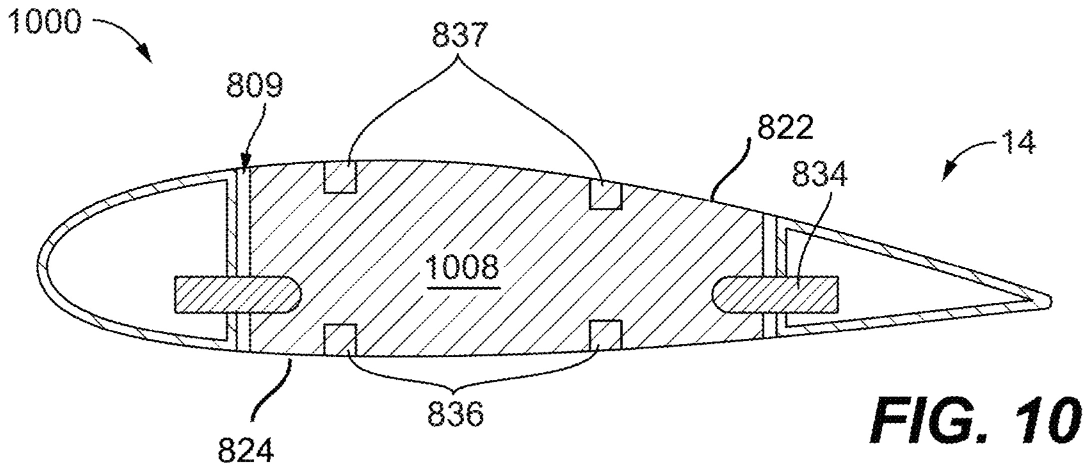
FIG. 10 is a schematic cross sectional side view of the aircraft power system of FIG. 6, showing another embodiment of mounting the energy source within the aircraft.

Referring to FIG. 10, yet another power system 1000 with another embodiment of the wing are shown. In this embodiment, the receptacle 809 passes completely through the wing 14 in a vertical direction (relative to the aircraft 1 being stationary on the ground), and the (e.g., electric, chemical) energy module 1008 of the power system 1000 has top and bottom surfaces that are shaped to complete the airfoil shape of the wing 14 around the receptacle 809. In an aspect, this arrangement may accommodate a relatively larger size of the power system 1000.

Figure 11:
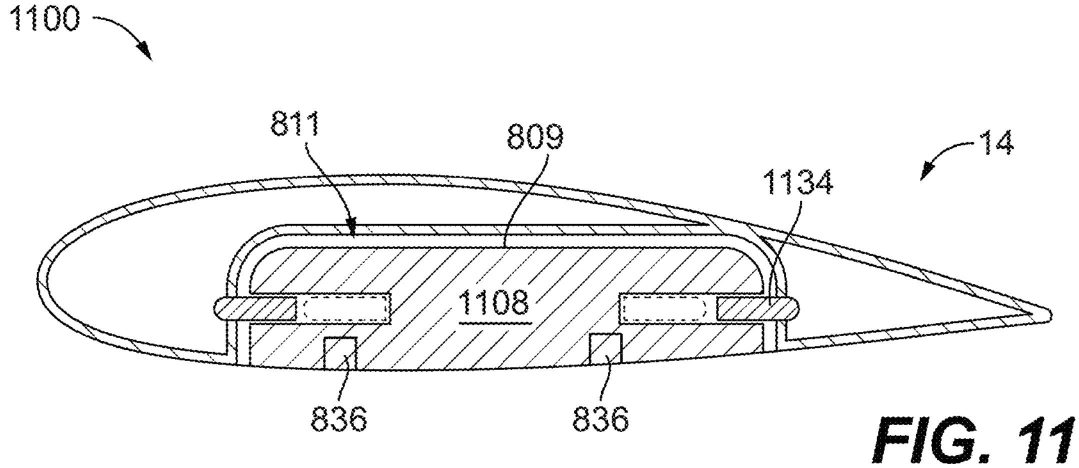
FIG. 11 is a schematic cross sectional side view of the aircraft power system of FIG. 6, showing another embodiment of mounting the energy source within the aircraft.

Referring to FIG. 11, yet another power system 1100 is shown and has a combination of elements from several of the aforementioned embodiments. For example, the connectors 1134 in FIG. 11 retract into the energy module when in the disengaged mode, rather than into the wing as in other embodiments. For brevity, since the elements have been described above, their description is not repeated. It is contemplated that in some embodiments the energy module 108, 508, 808, 908, 1008, 1108, 3108 may extend beyond surrounding wing surfaces 122, 124.

Figure 12:
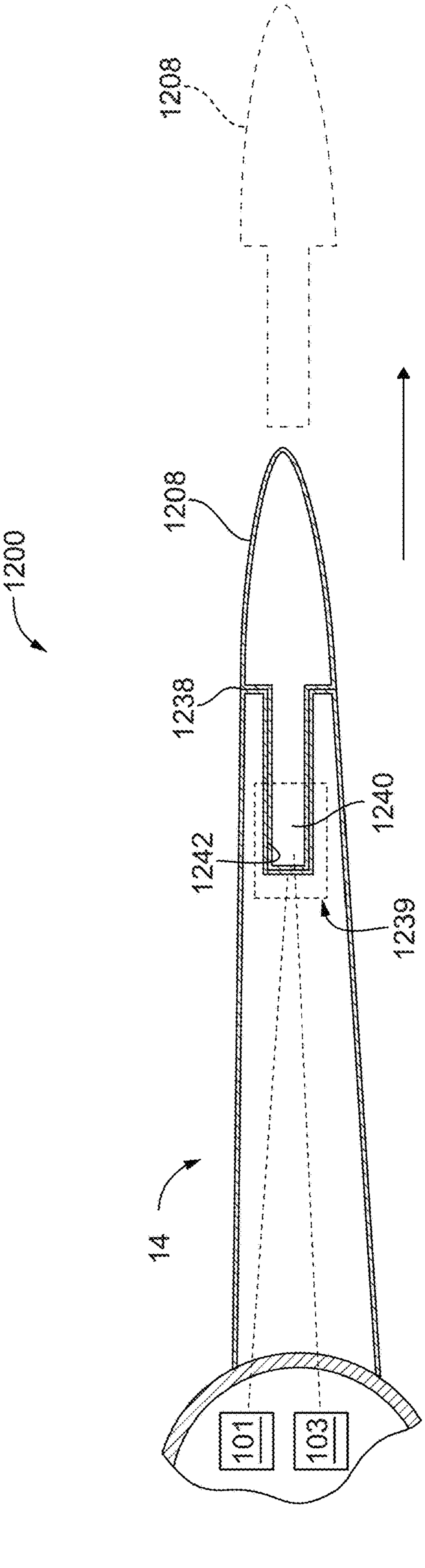
FIG. 12 is a schematic side view of an embodiment of a an aircraft constructed in accordance with at least one aspect of the present disclosure, showing an embodiment of an energy source mounted in a wing tip of an aircraft, separate from an electric machine.

Referring to FIG. 12, yet another embodiment of a power system, the power system 1200, is shown. The (e.g., electric, chemical) energy module 1208 of the power system 1200 is received in a receptacle 1242 defined in a tip 1238 of the wing and is shaped to complete the airfoil shape of the wing. The energy module 1208 is selectively removably engaged to the wing by a connector module 1239 which in this embodiment is part of the wing 14. The connector module 1239 may be of any suitable type, such as similar to the connector modules above for example.

Figure 13:
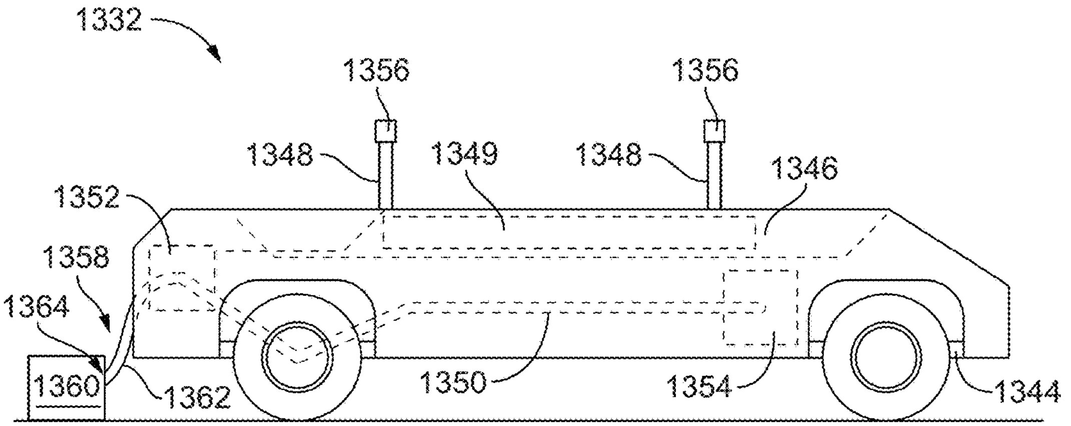
FIG. 13 is a schematic side view of a ground service vehicle constructed in accordance with at least one aspect of the present disclosure.

As shown in FIG. 13 a ground service vehicle (GSV) 1332 (the same or similar to ground vehicle 132) is provided for servicing aircraft and power systems, such as the various embodiments of aircraft and power systems described above. The GSV 1332 comprises a chassis 1344 defining a receiving bay 1346, a support structure 1348, which in this embodiment includes plurality of extendible supports extending from the receiving bay 1346, and a powertrain 1350 operatively connected to wheels or other suitable movers of the GSV 1332. In this embodiment but not necessarily in all embodiments, the powertrain 1350 is an electric powertrain and the GSV 1332 includes an onboard energy source 1352 operatively connected to the electric powertrain 1350 to power the electric powertrain 1350 and enable operation of the GSV 1332.

In some embodiments, one or more of the extendible supports 1348 includes an energy source connector 1356 (e.g., electrically, fluidly) connected to the onboard energy source 1352 and sized for recharging one or more of energy modules 108, 508, 608, 708, 808, 908, 1008, 1108, 1208, 2108, 3108 described herein. The extendible supports 1348 are structured to connect with respective anchor points of the power systems described herein above, for supporting the weight of the power system(s) that the GSV 1332 may be designed to service. In some embodiments, the extendible supports 1348 may be operatively connected to a lift mechanism 1349 of the GSV 1332 which may be configured to selectively lower and raise the power system engaged to the supports 1348 into and out of (or toward and away from) the receiving bay 1346.

Hence, the GSV 1332 may engage a given power system and remove that power system from the aircraft after that power system has been disengaged from the aircraft, as described herein above. Once removed, the GSV 1332 may secure the power system in the receiving bay 1346 for transport. In some embodiments, the receiving bay 1346 may be omitted. It is likewise contemplated that a movement system different from the extendible supports 1348 may be used, so long as the functionality described herein is provided. For example, GVS 1332 may be structured to lower a depleted energy module from the rest (e.g., receptacle 105) of aircraft 1 when aircraft 1 is stationary and on the ground G. GVS 1332 may be structured to raise a replenished an energy module toward and into (e.g., receptacle 105) of aircraft 1 when aircraft 1 is stationary and on the ground G.

In embodiments in which the GSV 1332 includes supports 1348 with built-in electrical (or fuel) connector(s) that correspond to respective electrical (or fuel) connectors on the power system(s) that the GSV 1332 may be designed to service, the GSV 1332 engaging a given one of such power systems may thus electrically (or fluidly) connect to the energy module of that power system and at least in part recharge (or refill) that energy module. In embodiments in which the GSV 1332 does not include supports with built-in connector(s), the GSV 1332 may recharge the energy module of that power system via a conventional connection(s) to the onboard energy source 1352, where such an energy source is present and has sufficient electric charge or amount of fuel, and/or via a conventional connection to a stationary energy source 1360, such as a power grid for example. To the latter end, in certain embodiments, the GSV 1332 may have a retractable electrical cord 1362 having a connection point 1364 on a distal end of the retractable cord 1362.

Figure 14:
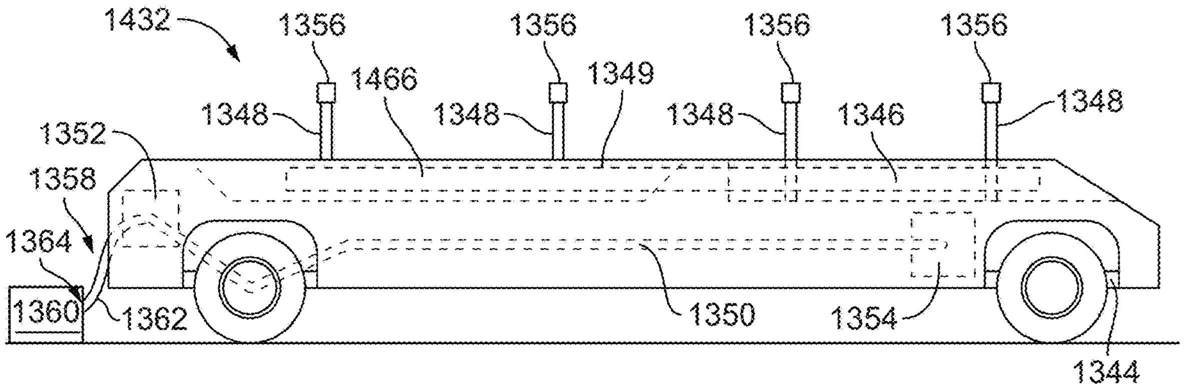
FIG. 14 is a schematic side view of another ground service vehicle constructed in accordance with at least one aspect of the present disclosure.

Shown in FIG. 14, the ground service vehicle 1432 is similar to that of ground service vehicle 1332, however, ground service vehicle 1432 further includes a receiving bay 1466 configured to receive an electric machine 104 having an energy module 108 mounted therein. In certain such embodiments, each of the electric energy module receiving bay 1346 and the electric machine/electric energy module combination receiving bay 1466 each include their own respective plurality of extendible supports 1348. It is contemplated however, that a single receiving bay 1346 can be included to receive both of, or one of the energy module 108 and electric machine 104/electric energy module combination.

A method for recharging or refilling the energy module (e.g., between flights) includes removing the power system 100 from the housing 102. In certain embodiments, removing the power system 100 includes lowering the power system 100 (including both the electric machine 104 or thermal engine 3104, and the energy source 108 mounted together with the electric machine 104 or thermal engine 3104) out of the housing 102 onto a service vehicle 132 below the wing 14. Removing the power system 600 can be performed in the same or similar manner as described with respect to power system 100, but can additionally include lifting the power system 600 out from a top of the wing 14, before lowering the system 600 onto the ground service vehicle 132.

In certain embodiments, removing the power system 800 includes lowering only the energy module 808 from the wing 14, leaving the electric machine 804 in the housing 802 mounted to the wing 14. In embodiments, removing the power system 600, 1000 can include lifting the power system 600, 1000 out of the wing 14 through the second surface 124, from above the wing 14, and the lowering on to service vehicle 132. In yet further embodiments, removing the power system 1200 can include removing the energy module 1208 in an outward direction from the wing tip 1238 (e.g. axially in direction of arrow A), then lowering onto ground service vehicle 132.

Figure 15:
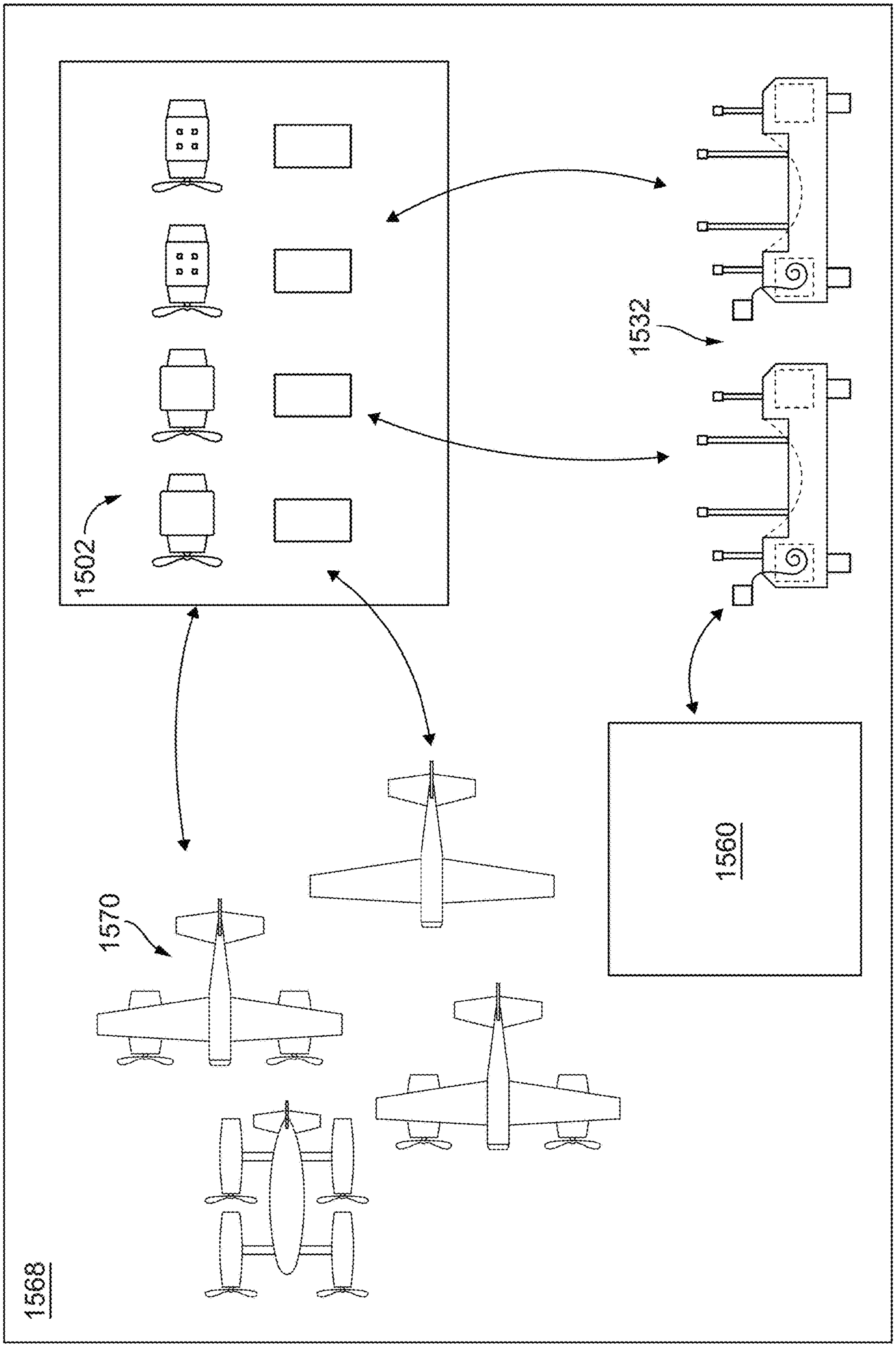
FIG. 15 is a schematic diagram of an airport system constructed in accordance with at least one aspect of this disclosure, showing the relationship between at least the embodiments of FIGS. 1-14 within the airport system.

Referring to FIG. 15, a system 1500 for recharging or refiling power systems, such as one or more of the power systems as described herein above, at an airport 1568, comprises, at least one stationary source of electrical power 1560 or fuel source, a fleet of ground service vehicles 1532 configured to swap out power systems of aircraft 1570 that may arrive at the airport 1568 with compatible power systems from a repository 1502 of power systems. In the present embodiment, the power systems in the repository are pre-charged (i.e., charged at the moment of arrival of a given aircraft 1570). In some cases, the aircraft 1570 may all be of the same type. In the present embodiment, the aircraft 1570 include a plurality of sizes, models, and types. The stationary source of power 1560 or fuel source may be configured to charge the ground service vehicles 1532 and/or the power systems. Each of the aircraft 1570 can have a suitable one or more of the power systems as described above herein, and the repository 1502 can include one or more pre-charged power systems that is/are compatible with (e.g. the same as) the one or more of the power systems aircraft 1570.

The system 1500 may thus allow for a method of servicing aircraft, e.g., which may include removing a power system, such as an at least partially depleted (e.g., discharged) power system and/or a power system requiring maintenance, from an aircraft by engaging that power system to one of the GSVs 1532, actuating a connector module (as described above) associated with that power system to disengage that power system from the aircraft, and moving the power system away from the aircraft on the GSV 1532. The method may further include delivering the power system on the GSV 1532 to a staging area and charging and/or performing maintenance on the power system. In some such embodiments, after removal of the power system, and in some cases before or during the charging and/or maintenance of the removed power system, the method further includes moving a compatible power system using another one of the GSVs 1532, such as a compatible serviced and pre-charged (a.k.a. ready-to-go) compatible power system to the aircraft, positioning it in place of the removed power system using the GSV 1532 and engaging it to the aircraft by correspondingly actuating the connector module (as described above). In at least some cases, this method may reduce time on ground of the aircraft.

Once charging and/or maintenance of the removed power system is complete, that removed power system becomes a ready-to-go power system which may then be used to swap out another power system of another one of the aircraft 1570 by using the GSV 1532 in a similar way.

In some embodiments of the system 1500, the power systems and receiving portions of the aircraft that the power system selectively removably engage to (e.g., receptacles as described above) are standardized such that a given power system can be used on two or more different models of aircraft. Stated otherwise, the two or more different models of aircraft may have the same or a compatible receptacle.

Airport 1568 of FIG. 15 may define an on-ground aircraft service system where depleted power systems and/or energy modules of aircraft 1570 may be replaced as needed. The on-ground aircraft service system may include aircraft 1570 including: a first (e.g., at least partially depleted) energy module; and a connector (e.g., movable member 114*e*) operable between: an engaged mode operatively connecting the first energy module to a rest of the aircraft 1570; and a disengaged mode operatively disconnecting the first energy module from the rest of aircraft 1570. The on-ground aircraft service system may include repository 1502 including a second (e.g., recharged) energy module for replacing the first energy module when the first energy module is depleted.

Repository 1502 may include a plurality of second energy modules. In some embodiments, the first energy module and a plurality of second energy modules may be vessels containing hydrogen. In some embodiments, the first energy module and the plurality of second energy modules may be vessels containing liquid hydrogen. In some embodiments, the first energy module and the plurality of second energy modules may be vessels containing gaseous hydrogen.

GSV 1532 may be structured to: removably receive the first energy module from aircraft 1570 while aircraft 1570 is on-ground and stationary, and while the connector (e.g., movable member 114*e*) is in the disengaged mode; deliver the first energy module to repository 1502; removably receive the second energy module from repository 1502; and deliver the second energy module to aircraft 1570 for operatively connecting the second energy module to aircraft 1570 in place of the first energy module.

In some embodiments, repository 1502 includes a plurality of second energy modules. In some embodiments, GSV 1532 may be structured to removably receive and transport any one of the plurality of second energy modules.

In some situations, it may be possible to swap energy modules between different aircraft models that have compatible receptacles 105 or other compatible docking mechanisms for their energy modules. For example, in situations where airport 1568 includes first and second aircraft, the second aircraft may include a connector (or other docking mechanism) that is operable to operatively connect the first energy module of the first aircraft to a rest of the second aircraft for powering a system of the second aircraft.

In the foregoing disclosure, some details are omitted for clarity as they can be conventional. Stated otherwise, details that are omitted may be implemented using conventional parts and conventional engineering techniques. Many different embodiments of the methods and systems of the present disclosure are contemplated. Some particular embodiments are described in the form of clauses herein next.

Clause 1. A system (100) for an aircraft (1), comprising:
an electric energy module (108); and
a connector module (114*c*) operatively connected to the electric energy module, the connector module being:

structured to attach the electric energy module to the aircraft when the connector module in an engaged mode while in use, and operable between the engaged mode (114*a*) and a disengaged mode (114*b*), the connector module in the disengaged mode while in use disengaging the electric energy module from the aircraft.

Clause 2. The system as recited in clause 1, further comprising an electric machine (104) attached to the electric energy module and electrically connected to the electric energy module.

Clause 3. The system as recited in clause 2, wherein the electric machine is electrically connected to the electric energy module via a plurality of conductors (108*c*), and a majority of each conductor of the plurality of conductors being disposed in its entirety mechanically between the electric machine and the electric energy module.

Clause 4. An aircraft comprising the system as recited in any preceding clause, further comprising an electrically-powered system (103), wherein the electric energy module is attached to the aircraft via the connector module and is electrically connected to the electrically-powered system.

Clause 5. The aircraft as recited in clause 4, wherein the electric energy module is electrically connected to the electrically-powered system via the connector module, and the connector module is structured to electrically disconnect the electric energy module from the electrically-powered system when the connector module is operated from the engaged mode to the disengaged mode.

Clause 6. The aircraft as recited in clause 5, wherein the electric energy module is positioned relative to the aircraft such that when the connector module is in the disengaged mode and the aircraft is stationary on a ground (G), gravity acts on the electric energy module to move the electric energy module toward the horizontal ground.

Clause 7. The aircraft as recited in clause 6, wherein:

the electric energy module comprises an electrical connector (137) on a side (108*b*) of the electric energy module that faces toward the ground when the aircraft is stationary on the ground;

the electrical connector is electrically connected to the electric energy module; and the electrical connector is sized to charge the electric energy module when connected to an electric power source (132).

Clause 8. The aircraft as recited in clause 1, wherein:

the connector module includes a movable member (114*e*) and an actuator (114*d*) operatively connected to the movable member to move the member while the system is in use between an engaged position (114*a*) in which the movable member engages the electrical energy module to the aircraft and a disengaged position (114*b*) in which the movable member disengages the electrical energy module from the aircraft, the movable member being in the engaged position when the connector module is in the engaged mode, and the movable member being in the disengaged position when the connector module is in the disengaged mode.

Clause 9. The aircraft as recited in clause 8, wherein the movable member is a plurality of movable members.

Clause 10. The aircraft as recited in clause 9, wherein:

a first sub-set of the plurality of movable members is disposed on a first side (108*a*) of the electrical energy module and a second sub-set of the plurality of movable members is disposed on a second side (108*b*) of the electrical energy module, and the second side is opposite the first side.

Clause 11. The aircraft as recited in clause 8, wherein the movable member is slidable between the engaged position and the disengaged position.

Clause 12. The aircraft as recited in clause 8, wherein:

one of the electrical energy module and the aircraft comprises a mating female structure corresponding to the movable member;

the movable member extends into the mating female structure when the movable member is in the engaged position; and the movable member is disposed outside of the mating female structure when the movable member is in the disengaged position.

Clause 13. An on-ground service system (1568), comprising:

the aircraft (1) of clause 7; and a ground service vehicle (1532) that includes an electrical connector (1356) structured to electrically connect to the electrical connector of the electrical energy module (108) when the aircraft is stationary on the ground (G).

Clause 14. The on-ground service system of clause 13, wherein:

the electrical energy module comprises a support structure (836, 837) that is structured to support a weight of the electrical energy module; and the ground vehicle further comprises a movable structure (1348), the movable structure being structured to movable relative to a rest of the ground vehicle to engage the support structure and to remove the electrical energy module from the aircraft while engaged to the support structure.

Clause 15. The on-ground service system of clause 14, wherein the electrical connector of the ground vehicle is part of the movable structure of the ground vehicle.

Clause 16. The on-ground service system of clause 15, wherein the electrical connector of the electrical energy module is part of the support structure of the electrical energy module and is positioned relative to the support structure such that when the movable structure engages the support structure, the electrical connector of the ground vehicle electrically connects to the electrical connector of the electrical energy module.

Clause 17. The on-ground service system of clause 15, further comprising an electrical machine (104) attached to the electrical energy module such that the electrical machine is removable from the aircraft together with the electrical energy module as a unit, and wherein the movable structure of the ground vehicle and the ground vehicle are structured to support a weight of the unit.

Clause 18. The on-ground service system of clause 14, wherein the aircraft of clause 7 is a first aircraft;

the on-ground service system further comprises a second aircraft that is of a different model than the first aircraft; and the second aircraft is structured to removably receive the electrical energy module of the first aircraft from the ground vehicle to power at least one system of the second aircraft.

Clause 19. An aircraft (1) comprising:

an electrical machine receptacle (105) defined in any of: a wing (14) of the aircraft, a tail (16) of the aircraft, and/or a fuselage (12) of the aircraft, the electrical machine receptacle configured to receive an aircraft power system (100), and a member (114) operatively connected to the electrical machine receptacle, the member movable between an engaged mode (114*a*) in which the member secures the aircraft power system to the electrical machine receptacle and a disengaged mode (114*b*) in which the member is disengaged from the aircraft power system and the aircraft power system is disengaged from the electric machine receptacle.

Clause 20. The aircraft of clause 19, wherein the aircraft power system includes one of or both of an electrical energy module (108) and an electrical machine (104).

Clause 21. The aircraft of clause 20, wherein the member includes a conductor (108*c*) electrically connected to an electrical system (103) of the aircraft, wherein in the engaged mode, the member contacts the conductor of the power system and thereby electrically connects the one of or both of the electrical energy module of the power system and the electrical machine of the power system to the electrical system of the aircraft, and wherein in the disengaged mode of the member the conductor of the member is out of contact with the conductor of the power system and thereby electrically disconnects the one of or both of the electrical energy module of the power system and the electrical machine of the power system from the electrical system of the aircraft.

Clause 22. A method of servicing an aircraft (1), comprising:

positioning the aircraft on a ground (G);

while the aircraft is on the ground, actuating a connector module (111) of the aircraft to release a power system (100) of the aircraft; and while the aircraft is on the ground, moving the power system of the aircraft away from the aircraft using a mechanical system (1342) that is separate from the aircraft.

Clause 23. The method as recited in clause 22, wherein the mechanical system is a ground service vehicle (132).

Clause 24. The method as recited in clause 22, further comprising, while the aircraft is on the ground, moving a different power system to the aircraft in place of the power system and actuating the connector module to engage the different power system to the aircraft.

Clause 25. The method as recited in any preceding clause, wherein each one of the power system and the different power system includes one of:

an electric machine (104) operatively connected to an electric power source (103) of the aircraft when that one of the power system and the different power system is engaged to the aircraft; and both a given electric machine (104) and an electrical energy module (108) electrically connected to the given electric machine to power the given electric machine.

Clause 26. A power system (100) for an aircraft (1), comprising:

an electrical energy module (108); and an electric machine (104) attached to the electrical energy module and electrically connected to the electrical energy module via a plurality of conductors (108*c*) sized for the electrical energy module to be operable to power the electric machine.

Clause 27. The system as recited in clause 26, further comprising a connector (114*c*) attached or engaged to one or both of the electrical energy module and the electric machine, the connector being operable to selectively removably engage the system to an aircraft and to selectively disengage the system from the aircraft.

Clause 28. The system as recited in clause 27, wherein the connector is retractable into a portion of the system to selectively disengage the system from the aircraft.

Clause 29. The system as recited in clause 27, wherein the connector includes an electrical conductor (108*c*) that is electrically connected to the electrical energy module.

Clause 30. The system as recited in clause 26, wherein at least a part of one or both of the electrical energy module and the electric machine defines an airfoil surface (122, 124).

Clause 31. The system as recited in clause 27, wherein one or both of the electrical energy module and the electric machine includes at least one anchor point (137) configured as a load bearing member for removing the one or both of the electrical energy module and the electric machine from an aircraft (1).

Clause 32. The system as recited in clause 30, wherein the airfoil surface is a first airfoil surface, and at least another part of one or both of the electrical energy module and the electric machine defines a second airfoil surface opposite the first airfoil surface, and the first and second airfoil surfaces (122, 124) define a lift direction (126).

Clause 33. The system as recited in clause 27, further comprising a wing (14) of the aircraft and wherein:

the wing defines a cavity (105) that selectively removably receives at least a part of one or at least a part of both of the electrical energy module (108) and the electric machine (104) in the cavity;

the wing includes a connecting module (111) open to the cavity; and the connector selectively removably engages the connecting structure of the wing and thereby selectively removably engages the electrical energy module and the electric machine to the wing.

Clause 34. The system as recited in clause 33, wherein at least a part of one or both of the electrical energy module and the electric machine defines an airfoil surface that completes an airfoil surface (122, 124) of the wing.

Clause 35. An aircraft (1) comprising:

an energy source receptacle (105) defined in a portion of the aircraft configured to receive an energy source (108), the energy source being selectively detachably connected to the portion of the aircraft and being at least in part selectively removably received in the energy source receptacle; and an electric motor (104) mounted to the aircraft and electrically connected to the energy source at least while the energy source is received in the energy source receptacle.

Clause 36. The aircraft as recited in clause 35, wherein the energy source receptacle is defined in a wing (14) of the aircraft and is recessed relative to a first surface (122) (124) of the wing, and wherein the energy source receptacle only extends through the wing stopping short of a second surface of the wing opposite the first surface.

Clause 37. The aircraft as recited in clause 35, wherein the first and second surfaces of the wing define an airfoil with an upward lift direction (126).

Clause 38. The aircraft as recited in clause 35, wherein the energy source receptacle is defined in a wing (14) of the aircraft and passes completely through the wing, making a respective opening through each of a first and second surfaces of the wing.

Clause 39. The aircraft as recited in any preceding clause, further including at least one electrical connector (114) disposed in the wing and at least partially in the energy source receptacle configured to retain the energy source within the energy source receptacle.

Clause 40. The aircraft as recited in clause 39, wherein the at least one electrical connector is configured to electrically connect the energy source to the electric machine and/or at least one additional electrically powered aircraft component (103) through an electrical conductor (108*c*).

Clause 41. The aircraft as recited in clause 39, wherein the at least one electrical connector is operatively connected to an actuator (114*d*) of the aircraft and the actuator is operable to retract the electrical connector to selectively detach the energy source from the aircraft.

Clause 42. The aircraft as recited in clause 38, wherein the wing further includes a plurality of structural ribs (518, 818), wherein density of the ribs a proximate the energy source receptacle is greater than density of the ribs in a remainder of the wing.

Clause 43. The aircraft as recited in any of clauses 36 to 38, wherein the wing includes a panel (130) slidingly engaged to the first surface of the wing moveable between an open position and a closed position, wherein in the absence of an energy source, the panel is in the closed position.

Clause 44. A method comprising:

removing an energy source (108) from an energy source receptacle (109) in an aircraft (1) without removing an electric machine (104) of the aircraft, the electric machine being powered by the energy source when the aircraft is in use.

Clause 45. The method as recited in clause 44, wherein the energy source receptacle is in a wing (14) of the aircraft, and the removing includes lowering the energy source out of the energy source receptacle onto a service vehicle (132).

Clause 45. The method as recited in clause 44, wherein the energy source receptacle is in a wing (14) of the aircraft, and the removing the energy source includes lifting the energy source upward from the energy source receptacle.

Clause 46. The method as recited in clause 44, wherein the energy source receptacle is in a wing (14) of the aircraft, and the removing the energy source includes removing the energy source in an outward direction from a tip of the wing.

Clause 47. An aircraft service kit 1502, comprising:

one or both of an electrical energy module (108) of an aircraft and an electric machine (104) of the aircraft, the electrical energy module sized to power the electric machine;

a ground service vehicle (132) defining a receiving bay (1346) at a top side of the ground service vehicle the receiving bay structured to support the one or both of the electrical energy module and the electric machine on the ground service vehicle; and a structure (1348) extending from a body (1344) of the ground service vehicle, the structure being:

movable relative to the body above the receiving bay to a receiving position, structured to removably engage the one or both of the electrical energy module and the electric machine when in the receiving position, structured to support a weight of the one or both of the electrical energy module and the electric machine, and while removably engaged to the one or both of the electrical energy module and the electric machine, movable with the one or both of the electrical energy module and the electric machine, relative to the body, from the receiving position to a secured position in which the one or both of the electrical energy module and the electric machine is secured in the receiving bay of the ground service vehicle.

Clause 48. The kit as recited in clause 47, further comprising an electrical energy source (1352) that is electrically connectable to the electrical energy module (108) to charge the electrical energy module.

Clause 49. The kit as recited in clause 48, wherein the electrical energy source is an onboard electrical energy source (1352), the ground service vehicle includes an electric powertrain (1350) operable to move the ground service vehicle, and the electric power system is powered by the onboard electrical energy source.

Clause 50. The kit as recited in clause 49, wherein:

the structure includes a plurality of extendible supports (1348), at least one of the extendible supports includes a conductor (1356) electrically connected to the onboard energy source (1352), the electrical energy module includes a corresponding conductor (137) positioned relative to a rest of the electrical energy module such that when the electrical energy module is engaged by the at least one of the extendible supports, the conductor of the at least one of the extendible supports electrically mates with the corresponding conductor of the electrical energy module to allow charging of the electrical energy module.

Clause 51. A method of ground servicing an aircraft (1) comprising:

positioning a ground service vehicle (1332) proximate the aircraft;

connecting extendible supports (1348) of the ground service vehicle to anchor points (137) of a power system (100) of the aircraft;

after the connecting, disengaging a connector module (111) of the aircraft that engages the power system to a rest of the aircraft; and after the disengaging, removing the power system from the aircraft using the extendible supports.

Clause 52. The method as recited in clause 51, wherein the disengaging includes sending a signal to the connector module (111) to operate a powered actuator (113) associated with the connector module.

Clause 53. The method as recited in clause 51, wherein the power system includes an electrical energy module (108) and the method includes recharging the electrical energy module from the ground service vehicle after the removing the power system from the aircraft.

Clause 54. The method as recited in clause 53, wherein the recharging includes connecting the ground service vehicle to a stationary electrical energy source (1360).

Clause 55. The method as recited in clause 51, wherein the removing includes moving the power system out of a receptacle (105) of the aircraft.

Clause 56. The method as recited in any preceding clause, wherein the removing includes lifting the power system from a receptacle in the aircraft opening upward, and then lowering the power system onto a receiving bay of the ground service vehicle.

Clause 57. The method as recited in clause 51, wherein the power system includes one or both of an electric machine (104) and an electrical energy module (108).

Clause 58. The method as recited in clause 57, wherein the power system includes the electric machine and the electric machine is sized to drive an air mover such as propeller (106) of the aircraft.

Clause 59. An aircraft propulsor system (100) comprising:

an energy source housing (109);

an energy source (108) within the energy source housing; and at least one electrical connector (114) extending from the energy source through the energy source housing electrically connecting the energy source to an aircraft (1).

Clause 60. The system as recited in clause 59, wherein the at least one electrical connector is retractable within the energy source housing between a first position (114*a*) and a second position (114*b*), wherein the first position is an unlocked position, and the second position is a locked position.

Clause 61. The system as recited in clause 59, wherein the energy source housing defines an airfoil surface (122, 124).

Clause 62. The system as recited in clause 61, wherein the energy source housing includes at least one anchor point (137) configured as a load bearing member for removing the energy source housing from an aircraft wing, wherein the anchor point is defined in the airfoil surface.

Clause 63. The system as recited in clause 61, wherein the airfoil surface is a first airfoil surface (122), and wherein the energy source housing includes a second airfoil surface (124) opposite the first airfoil surface, wherein the first and second airfoil surfaces define a lift direction (126).

Clause 64. The system as recited in clause 63, wherein first and second airfoil surfaces of the energy source housing (108*a*, 108*b*) match an airfoil surface of the wing (14).

Clause 65. The system as recited in clause 63, wherein the first airfoil surface includes at least one lower anchor point (137) as a load bearing member, and wherein the second airfoil surface includes at least one upper anchor point (836) as a load bearing member.

Clause 66. A system (1568) for a plurality of different models of aircraft (1570), comprising:

a plurality of electric energy modules (1502), each electric energy module of the plurality of electric energy modules configured to power at least one electric component of an aircraft (1); and a plurality of connectors (114*c*), each connector of the plurality of connectors configured to:

a) attach to an aircraft of the plurality of different models of aircraft, and b) selectively engage a respective connector of the plurality of connectors to any one of the plurality of electric energy modules.

Clause 67. The system of clause 66, wherein the connector is configured to electrically connect the any one of the plurality of electric energy modules to an electrical system (103) of the aircraft to which that connector is configured to be attached.

Clause 68. The system of clause 67, wherein the connector includes a body and a conductor (114*e*) movable relative to the body between:

an engaged mode (114*b*) in which the conductor engages a respective one of the plurality of electric energy modules to the connector and electrically connects to the any one of the plurality of electric energy modules, and a disengaged mode (114*a*) in which the conductor is disengaged from and electrically disconnected from the any one of the plurality of electric energy modules, wherein the conductor is sized to accommodate a rated electrical current associated with the electrical system of the aircraft.

Clause 69. The system of clause 68, wherein the conductor is one of a plurality of conductors.

Clause 70. The system of clause 68, wherein the conductor extends into a corresponding aperture (115) in a respective one of the plurality of electric energy modules when the conductor is in the engaged mode.

Clause 71. The system of clause 66, wherein each electric energy module of the plurality of electric energy modules includes: a top side (108*a*), a bottom (108*b*) side opposite the top side, the bottom side facing a tarmac when that electric energy module is engaged to a given aircraft of the plurality of aircraft via a respective connector of the plurality of connectors while the given aircraft is disposed on the tarmac/ground (G), and an electrical quick connect (137) on the bottom side.

Clause 72. The system of clause 71, wherein the electrical quick connect includes a plurality of a structural components structured to support a weight of that electric energy module on the plurality of structural components.

Clause 73. The system of clause 66, further comprising a plurality of electrical machines, each electrical machine of the plurality of electrical machines being attached to and electrically connected to a respective electrical energy module of the plurality of electric energy modules.

Clause 74. The system of clause 72, wherein the electrical machine is attached to a housing (102) of the respective electrical energy module.

Clause 75. The system of clause 72, wherein the electrical machine is attached to a respective electrical energy module via the quick connect.

Clause 76. The system of clause 72, wherein the quick connect includes a powered actuator operable to disengage the quick connect.

Clause 77. The system of clause 66, wherein the connector includes a powered actuator (113) operable to disengage the connector from a respective one of the plurality of electric energy modules.

Clause 78. A method of servicing aircraft, comprising:

removing an at least partially discharged energy module (108) from a receptacle in an aircraft (1) onto a ground service vehicle (132); and installing a charged energy module into the receptacle in an aircraft.

Clause 79. The method as recited in clause 78, wherein installing a charged energy source is performed by the same ground service vehicle that performed removing the energy source.

Clause 80. The method as recited in clause 78, wherein installing a charged energy source is performed by a different ground service vehicle than the ground service vehicle that performed removing the energy source.

Clause 81. The method as recited in clause 78, wherein installing a charged energy source includes installing the same energy source that was removed from the aircraft.

Clause 82. The method as recited in clause 78, wherein installing a charged energy source includes installing a different energy source than the energy source that was removed from the aircraft.

Clause 83. The method as recited in clause 78, further comprising delivering the at least partially discharged energy source to a staging area, wherein the staging area is configured to recharge the at least partially discharged energy source.

Clause 84. The method as recited in clause 83, further comprising retrieving the charged energy source from the staging area after recharging is complete.

Clause 85. The method as recited in clause 84, further comprising connecting the charged energy source to an aircraft that is the same aircraft from which the energy source was removed.

Clause 86. The method as recited in clause 84, further comprising connecting the charged energy source to an aircraft that is a different aircraft from which the energy source was removed.

Clause 87. The method as recited in clause 84, wherein the energy source is housed within an energy source housing mounted together with an electric machine, and further comprising connecting the charged energy source and electric machine to an aircraft that is the same model aircraft as the aircraft from which the energy source and propulsor were removed.

Clause 88. The method as recited in clause 84, wherein the energy source is housed within an energy source housing (109) mounted together with an electric machine (104), and further comprising connecting the charged energy source and electric machine to an aircraft that is a different model aircraft than that of the aircraft from which the energy source and propulsor were removed.

It is contemplated that the sustainable energy modules described herein may be of shapes and sizes that are different from those shown in the figures, to suit various types and models of aircraft for example.

The methods and systems of the present disclosure, as described above and shown in the drawings, provide for efficient charging of power systems that may be used in hybrid electric, or all electric, aircraft. Such systems and methods increase the speed at which an aircraft can be made ready for a next flight, and can allow for a repository of multiple different types (e.g., electric, chemical) and sizes of energy modules and/or power systems that can be used for multiple different aircraft. While the apparatus and methods of the subject disclosure have been shown and described, those skilled in the art will readily appreciate that changes and/or modifications may be made thereto without departing from the scope of the subject disclosure.

What is claimed is:

1. An on-ground aircraft service system comprising:

an aircraft including:

a first sustainable energy module received inside a receptacle formed in a wing of the aircraft, the receptacle having a downward-facing opening permitting a removal of the first sustainable energy module from the receptacle by downward movement of the first sustainable energy module relative to the wing, the first sustainable energy module having a bottom surface shaped to complete an airfoil shape of the wing across the opening of the receptacle; and a connector operable between: an engaged mode operatively connecting the first sustainable energy module to a rest of the aircraft when the bottom surface of the first sustainable energy module is in register with the opening of the receptacle and completes the airfoil shape of the wing across the opening of the receptacle; and a disengaged mode operatively disconnecting the first sustainable energy module from the rest of the aircraft; and a repository including a second sustainable energy module for replacing the first sustainable energy module when the first sustainable energy module is depleted.

2. The on-ground aircraft service system of claim 1, wherein the connector is operable to operatively connect the first sustainable energy module to the wing of the aircraft.

3. The on-ground aircraft service system of claim 1, wherein a transition of the connector to the disengaged mode permits the removal of the first sustainable energy module from the wing.

4. The on-ground aircraft service system of claim 3, wherein, in the disengaged mode, the connector is operable to permit removal of the first sustainable energy module from the wing solely through gravity acting on the first sustainable energy module.

5. The on-ground aircraft service system of claim 1, wherein the first sustainable energy module includes a vessel containing compressed hydrogen.

6. The on-ground aircraft service system of claim 1, wherein the first sustainable energy module includes a vessel containing liquid hydrogen.

7. The on-ground aircraft service system of claim 1, comprising one or both of a propulsor and an auxiliary power unit powered by the first sustainable energy module, at least one of the one or both of the propulsor and the auxiliary power unit is disposed in a same section of the aircraft as the first sustainable energy module.

8. The on-ground aircraft service system of claim 7, wherein the first sustainable energy module is disposed at least partially within a vertical projection of an outline of the at least one of the one or both of the propulsor and the auxiliary power unit.

9. The on-ground aircraft service system of claim 7, wherein:

the aircraft includes a liquid fuel tank for containing a liquid fuel; and the at least one of the one or both of the propulsor and the auxiliary power unit is operable on the liquid fuel.

10. The on-ground aircraft service system of claim 9, wherein the at least one of the one or both of the propulsor and the auxiliary power unit is switchable between operation on the liquid fuel and operation on the first sustainable energy module.

11. The on-ground aircraft service system of claim 10, wherein the at least one of the one or both of the propulsor and the auxiliary power unit is switchable between operation on the liquid fuel and operation on the first sustainable energy module during flight.

12. The on-ground aircraft service system of claim 1, comprising a ground vehicle structured to:

removably receive the first sustainable energy module from the aircraft while the aircraft is on-ground and stationary, and while the connector is in the disengaged mode;

deliver the first sustainable energy module to the repository;

removably receive the second sustainable energy module; and deliver the second sustainable energy module to the aircraft for operatively connecting the second sustainable energy module to the aircraft in place of the first sustainable energy module.

13. The on-ground aircraft service system of claim 12, wherein the ground vehicle is structured to lower the first sustainable energy module from the rest of the aircraft.

14. The on-ground aircraft service system of claim 13, wherein the ground vehicle is structured to raise the second sustainable energy module toward the rest of the aircraft.

15. The on-ground aircraft service system of claim 12, wherein:

the aircraft is a first aircraft;

the connector is a first connector;

the on-ground aircraft service system includes a second aircraft that is of a different model than the first aircraft; and the second aircraft includes a second connector operable to operatively connect the first sustainable energy module of the first aircraft to a rest of the second aircraft for powering a system of the second aircraft.

16. The on-ground aircraft service system of claim 12, wherein:

the second sustainable energy module is one of a plurality of second sustainable energy modules included in the repository; and the ground vehicle is structured to removably receive and transport any one of the plurality of second sustainable energy modules.

17. The on-ground aircraft service system of claim 16, wherein the first sustainable energy module and the plurality of second sustainable energy modules are vessels containing hydrogen.

18. The on-ground aircraft service system of claim 17, wherein the first sustainable energy module and the plurality of second sustainable energy modules are vessels containing liquid hydrogen.

19. The on-ground aircraft service system of claim 17, wherein the first sustainable energy module and the plurality of second sustainable energy modules are vessels containing gaseous hydrogen.

20. The on-ground aircraft service system of claim 1, wherein the first sustainable energy module includes a plurality of cylindrical vessels containing compressed fuel.

* * * * *